United States Patent
Allen et al.

(10) Patent No.: US 10,473,131 B1
(45) Date of Patent: Nov. 12, 2019

(54) HELICAL STRAKES AND COLLAR

(71) Applicant: VIV Solutions LLC, Richmond, TX (US)

(72) Inventors: Donald Wayne Allen, Richmond, TX (US); Julie Ann Dehne, Cypress, TX (US); Jeffrey Robert Dupuis, Houston, TX (US)

(73) Assignee: VIV SOLUTIONS LLC, Richmond, TX (US)

( * ) Notice: Subject to any disclaimer, the term of this patent is extended or adjusted under 35 U.S.C. 154(b) by 0 days.

(21) Appl. No.: 15/633,594

(22) Filed: Jun. 26, 2017

Related U.S. Application Data

(60) Provisional application No. 62/463,514, filed on Feb. 24, 2017, provisional application No. 62/451,222, (Continued)

(51) Int. Cl.
| | |
|---|---|
| *F16L 58/00* | (2006.01) |
| *F16L 57/00* | (2006.01) |
| *F16B 7/04* | (2006.01) |
| *F15D 1/10* | (2006.01) |
| *E21B 17/10* | (2006.01) |
| *F16M 7/00* | (2006.01) |

(Continued)

(52) U.S. Cl.
CPC ............ *F16B 7/042* (2013.01); *E21B 17/006* (2013.01); *E21B 17/1078* (2013.01); *F15D 1/10* (2013.01); *F16L 1/123* (2013.01); *F16L 57/00* (2013.01); *F16L 58/00* (2013.01); *F16M 7/00* (2013.01); *B63B 2021/504* (2013.01); *E02B 17/0017* (2013.01)

(58) Field of Classification Search
CPC ............ F16L 1/123; F16L 57/00; F16L 58/00
USPC ........................................ 405/211, 211.1, 216
See application file for complete search history.

(56) References Cited

U.S. PATENT DOCUMENTS

| | | |
|---|---|---|
| 879,586 A | 2/1908 | Reynolds |
| 890,125 A | 6/1908 | Crampton |

(Continued)

FOREIGN PATENT DOCUMENTS

| | | |
|---|---|---|
| EP | 2525123 | 11/2012 |
| GB | 2335248 | 9/1999 |

(Continued)

OTHER PUBLICATIONS

Final Office Action dated Jul. 15, 2015, U.S. Appl. No. 13/343,408.
(Continued)

*Primary Examiner* — Frederick L Lagman
(74) *Attorney, Agent, or Firm* — Womble Bond Dickinson (US) LLP

(57) ABSTRACT

A vortex-induced vibration (VIV) suppression system including a strake having a cylindrical body portion dimensioned to encircle an underlying tubular and having opposing ends that form at least one gap extending from a top end to a bottom end of the body portion, a fin portion extending radially outward from the body portion and helically positioned around the body portion, and a connecting member dimensioned to secure the opposing ends of the body portion in a fixed position with respect to one another; and a collar dimensioned to encircle the underlying tubular and position the strake at a fixed axial location along the underlying tubular.

6 Claims, 25 Drawing Sheets

Related U.S. Application Data filed on Jan. 27, 2017, provisional application No. 62/432,451, filed on Dec. 9, 2016, provisional application No. 62/360,463, filed on Jul. 10, 2016.

(51) Int. Cl.
| | | |
|---|---|---|
| *E21B 17/00* | (2006.01) | |
| *F16L 1/12* | (2006.01) | |
| *B63B 21/50* | (2006.01) | |
| *E02B 17/00* | (2006.01) | |

(56) References Cited

U.S. PATENT DOCUMENTS

| | | |
|---|---|---|
| 2,401,783 A | 6/1946 | Wilcoxon |
| 3,176,646 A | 4/1965 | Natwick et al. |
| 3,194,204 A | 7/1965 | Nichols et al. |
| 3,248,886 A | 5/1966 | Blenkarn |
| 3,321,924 A | 5/1967 | Liddell |
| 3,343,515 A | 9/1967 | Nichols et al. |
| 3,454,051 A | 7/1969 | Goepfert et al. |
| 3,472,196 A | 10/1969 | Ewing et al. |
| 3,557,840 A | 1/1971 | Maybee |
| 3,611,976 A | 10/1971 | Hale |
| 3,962,982 A | 6/1976 | Marchay et al. |
| 4,033,279 A | 7/1977 | Stiles |
| 4,365,574 A | 12/1982 | Norminton |
| 4,398,487 A | 8/1983 | Ortloff et al. |
| 4,474,129 A | 10/1984 | Watkins et al. |
| 4,505,617 A | 3/1985 | Miller et al. |
| 4,567,841 A | 2/1986 | Hale |
| 4,657,116 A | 4/1987 | Gardner et al. |
| 4,700,651 A | 10/1987 | Hale |
| 4,722,367 A * | 2/1988 | Swink et al. |
| 5,050,445 A | 9/1991 | Duffy |
| 5,335,620 A | 8/1994 | Small |
| 5,421,413 A * | 6/1995 | Allen et al. |
| 5,456,199 A | 10/1995 | Kernkamp |
| 5,722,340 A | 3/1998 | Sweetman |
| 5,845,827 A | 12/1998 | Reising |
| 5,869,159 A | 2/1999 | Padilla |
| 6,019,549 A | 2/2000 | Blair et al. |
| 6,048,136 A | 4/2000 | Denison et al. |
| 6,067,922 A | 5/2000 | Denison et al. |
| 6,347,911 B1 * | 2/2002 | Blair et al. |
| 6,401,646 B1 | 6/2002 | Masters et al. |
| 6,561,734 B1 | 5/2003 | Allen et al. |
| 6,565,287 B2 | 5/2003 | McMillan et al. |
| 6,685,394 B1 | 2/2004 | Allen et al. |
| 6,695,540 B1 | 2/2004 | Taquino |
| 6,702,026 B2 | 3/2004 | Allen et al. |
| 6,755,595 B2 | 6/2004 | Oram |
| 6,896,447 B1 * | 5/2005 | Taquino |
| 7,017,666 B1 | 3/2006 | Allen et al. |
| 7,458,752 B2 | 12/2008 | Esselbrugge et al. |
| 7,485,801 B1 | 2/2009 | Pulter et al. |
| 7,600,945 B2 | 10/2009 | Burgess |
| 7,674,074 B2 | 3/2010 | Masters et al. |
| 7,766,580 B2 | 8/2010 | Dartford et al. |
| 7,842,396 B2 | 11/2010 | White |
| 8,511,245 B2 | 8/2013 | Dehne et al. |
| 8,770,894 B1 | 7/2014 | Allen et al. |
| 8,851,005 B2 | 10/2014 | Tonchia |
| 8,944,722 B1 * | 2/2015 | Allen et al. |
| 9,080,392 B1 * | 7/2015 | Allen et al. |
| 9,511,825 B1 | 12/2016 | Henning et al. |
| 9,523,247 B1 * | 12/2016 | Allen et al. |
| 9,523,456 B1 | 12/2016 | Allen et al. |
| 9,803,431 B1 * | 10/2017 | Allen et al. |
| 2002/0074133 A1 * | 6/2002 | McMillan et al. |
| 2003/0007839 A1 * | 1/2003 | Brown |
| 2003/0074777 A1 | 4/2003 | McMillan et al. |
| 2004/0013473 A1 | 1/2004 | Gibson |
| 2006/0153642 A1 | 7/2006 | Esselbrugge et al. |
| 2006/0231008 A1 * | 10/2006 | Allen et al. |
| 2006/0280559 A1 | 12/2006 | Allen et al. |
| 2007/0140797 A1 | 6/2007 | Armstrong |
| 2007/0196181 A1 * | 8/2007 | Tyrer et al. |
| 2008/0025800 A1 | 1/2008 | Watkins |
| 2008/0050181 A1 | 2/2008 | Masters et al. |
| 2008/0131210 A1 * | 6/2008 | Wajnikonis |
| 2008/0236469 A1 * | 10/2008 | Masters et al. |
| 2009/0185867 A1 * | 7/2009 | Masters et al. |
| 2009/0185868 A1 | 7/2009 | Masters et al. |
| 2010/0129159 A1 | 5/2010 | Brown |
| 2010/0156088 A1 | 6/2010 | Masters et al. |
| 2010/0181064 A1 | 7/2010 | Knobloch et al. |
| 2010/0215440 A1 * | 8/2010 | Wajnikonis |
| 2011/0200396 A1 | 8/2011 | Allen et al. |
| 2012/0291687 A1 * | 11/2012 | Dehne et al. |
| 2013/0014685 A1 | 1/2013 | Tonchia |
| 2013/0039702 A1 * | 2/2013 | West et al. |
| 2015/0086276 A1 | 3/2015 | Harbison et al. |
| 2018/0100353 A1 * | 4/2018 | Allen et al. |

FOREIGN PATENT DOCUMENTS

| | | |
|---|---|---|
| GB | 2335248 A * | 9/1999 |
| GB | 2362444 | 11/2001 |
| WO | WO-0177563 A1 * | 10/2001 |
| WO | WO-2005026560 | 3/2005 |
| WO | WO-2008064102 | 5/2008 |
| WO | WO-2009070483 | 6/2009 |
| WO | WO-2011022332 | 2/2011 |

OTHER PUBLICATIONS

Final Office Action dated Sep. 7, 2016, U.S. Appl. No. 13/343,408.
Final Office Action dated Sep. 4, 2014, U.S. Appl. No. 13/343,408.
Non-final Office Action dated Mar. 27, 2014, U.S. Appl. No. 13/725,077.
Non-final Office Action dated Mar. 9, 2016, U.S. Appl. No. 13/343,408.
Non-final Office Action dated Apr. 9, 2014, U.S. Appl. No. 13/343,408.
Allen, D. W. et al., "Henning Devices: A new class of VIV suppression apparatus for offshore tubulars", Offshore Technology Conference 19881, 2009, 1-9.
Lee, L. et al., "Blade henning devices for VIV suppression of offshore tubulars", Proceedings of OMAE: 28th International Conference on Ocean, Offshore and Arctic Engineering, Shell Global Solutions (US) Inc., 2009, 1-6.
VIV Solutions LLC, Non-Final Office Action dated Apr. 5, 2017, U.S. Appl. No. 13/841,720.
VIV Solutions LLC, Non-Final Office Action dated Jul. 7, 2017, U.S. Appl. No. 13/841,720.
Non-Final Office Action dated May 13, 2015, U.S. Appl. No. 13/841,720.
Final Office Action dated Nov. 17, 2015, U.S. Appl. No. 13/841,720.
Final Office Action dated Dec. 15, 2016, U.S. Appl. No. 13/841,720.
VIV Solutions LLC, Non-Final Office Action dated Apr. 7, 2016, U.S. Appl. No. 14/293,775.
VIV Solutions LLC, Final Office Action dated Jul. 27, 2016, U.S. Appl. No. 14/293,775.
VIV Solutions, Non-final Office Action dated Aug. 21, 2012 for U.S. Appl. No. 13/274,207., 7 pages.
VIV Solutions LLC, European search report dated Sep. 26, 2012 for EP Appln. No. 12168141.5.
VIV Solutions LLC, Non-Final Office Action dated May 12, 2017, U.S. Appl. No. 15/099,471.

* cited by examiner

HELICAL STRAKES AND COLLAR

CROSS-REFERENCE TO RELATED APPLICATION

The application is a non-provisional application of U.S. Provisional Patent Application No. 62/360,463, filed Jul. 10, 2016, U.S. Provisional Patent Application No. 62/432,451, filed Dec. 9, 2016, U.S. Provisional Patent Application No. 62/451,222, filed Jan. 27, 2017, and U.S. Provisional Patent Application No. 62/463,514, filed Feb. 24, 2017, all of which are incorporated herein by reference.

FIELD

A helical strake and collar system. Other embodiments are also described herein.

BACKGROUND

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections. Both helical strakes and fairings can provide sufficient VIV suppression, but can be slow and unsafe to install.

Helical strakes are typically banded onto the underlying tubular. Banding allows for a fairly large amount of compressive force to be transmitted through the helical strake to the underlying tubular so that the helical strake does not slide axially (e.g. due to gravity) due to friction.

A problem associated with banded helical strakes is that the bands are expensive. Another problem with banded helical strakes is that they are slow to install. Still another problem associated with banded helical strakes is that the bands are unable to provide sufficient tension when the underlying tubular diameter is too large or if the coefficient of friction between the strake and the underlying tubular is too small.

One important consideration for helical strakes is that the tubular diameter can vary along the tubular length. This can make determination of the friction between the helical strake and the underlying tubular both uncertain and difficult to manage.

SUMMARY

The present invention consists of helical strakes that are fastened to each other, fastened to a collar, or restrained axially by a collar. The helical strakes disclosed herein provide various advantages, including being relatively inexpensive, fast to install, able to stay in position when the underlying tubular is large, can stay in position when the coefficient of friction between the strake and the underlying tubular is too small, can stay in position even when the tolerance range of the underlying tubular diameter varies widely and can stay in position when the underlying tubular diameter changes due to hydrostatic pressure.

More specifically, in one embodiment, the invention is directed to a vortex-induced vibration (VIV) suppression system including a strake having a cylindrical body portion dimensioned to encircle an underlying tubular and having opposing ends that form at least one gap extending from a top end to a bottom end of the body portion, a fin portion extending radially outward from the body portion and helically positioned around the body portion, and a connecting member dimensioned to secure the opposing ends of the body portion in a fixed position with respect to one another. The system further including a collar dimensioned to encircle the underlying tubular and position the strake at a fixed axial location along the underlying tubular. The connecting member may include a band that entirely encircles the cylindrical body portion of the strake. The fin portion may include a channel extending in a widthwise direction across the fin portion, and the band is inserted within the channel. The fin portion may include a channel extending in a widthwise direction across the fin portion and a spring positioned within the channel, and the band is inserted within the channel and over the spring. In some cases, the fin portion may include an opening extending in a widthwise direction through the fin portion, and the band is inserted through the band opening. In some cases, the band is an adjustable band, and the adjustable band is operable to be adjusted by hand or using a hand tool. Still further, the band may include a buckle, and the buckle may be dimensioned to secure the band in a closed position around the cylindrical body portion. In still further embodiment, the connecting member comprises a first protruding member, a second protruding member and a fastener, wherein the first protruding member protrudes from a side of the cylindrical body portion near one of the opposing ends and the second protruding member protrudes from a side of the cylindrical body portion near another of the opposing ends, and the fastener connects the first protruding member to the second protruding member. In some embodiment, the fastener is a bolt or a cable tie. In addition, the opposing ends may include at least two sets of opposing ends, and the at least two sets of opposing ends form at least two gaps extending from a top end to a bottom end of the body portion. The connecting member may include a bolt, and the bolt attaches the strake to the collar. The bottom end of the body portion may include a strake flange and the collar comprises a collar flange, and the bolt is inserted through the strake flange and the collar flange.

In other embodiments, the invention is directed to a vortex-induced vibration (VIV) suppression device including a body portion dimensioned to encircle an underlying tubular, the body portion having a cylindrical sleeve having a top end and a bottom end, a fin portion extending radially outward from the cylindrical sleeve and extending between the top end and the bottom end, and an engaging member positioned at the top end or the bottom end of the cylindrical sleeve or positioned at an end of the fin portion, wherein the engaging member is dimensioned to engage with an adjacent structure encircling the underlying tubular. The engaging member may include a flange that encircles the end of the sleeve. The flange may include a hollow interior area, and the engaging member further comprises a nut, and wherein the nut is positioned within the hollow interior area of the flange. The engaging member may further include a bolt and a nut, and the bolt may be inserted through the flange and the adjacent structure, and the nut secures the bolt within the flange and the adjacent structure. The flange may include a non-planar structure that is configured to mate with a non-planar structure associated with the adjacent structure. In some cases, the engaging member may include a bolt, and wherein the bolt engages with a portion of the adjacent structure to secure the fin portion to the adjacent structure. The bolt may be positioned at the end of the fin, and the adjacent structure is a collar or a strake. In other cases, the bolt is positioned at the top end or the bottom end of the body portion, and the adjacent structure is a collar or a strake. The engaging member may include a band, and wherein the fin and the adjacent structure have openings through which the band is inserted to connect the fin and the adjacent structure together. The VIV suppression device may be a strake, and the adjacent structure is a VIV suppression device. The VIV suppression device may be a strake and the adjacent structure is a collar dimensioned to position the strake at a fixed axial location along the underlying tubular.

In still further embodiments, the invention is directed to a vortex-induced vibration (VIV) suppression system including a strake having a cylindrical body portion dimensioned to encircle an underlying tubular, a fin portion extending radially outward from the body portion and having a top end and a bottom end, and an engaging member coupled to the top end or the bottom end of the fin portion, and an adjacent structure dimensioned to encircle the underlying tubular and positioned at an end of the strake. The strake may be a first strake, and the adjacent structure is a second strake, the second strake having a cylindrical body portion and a fin portion extending radially outward from the body portion. In some cases, the fin portion of the first strake overlaps with the fin portion of the second strake, and a band is inserted through openings in both fin portions to secure the first strake to the second strake. In some cases, the engaging member is a bolt connecting the bottom end of the fin portion of the first strake with a top end of the fin portion of the second strake. The adjacent structure may be a collar, and the engaging member is a bolt connecting the bottom end of the fin portion with the collar.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1:
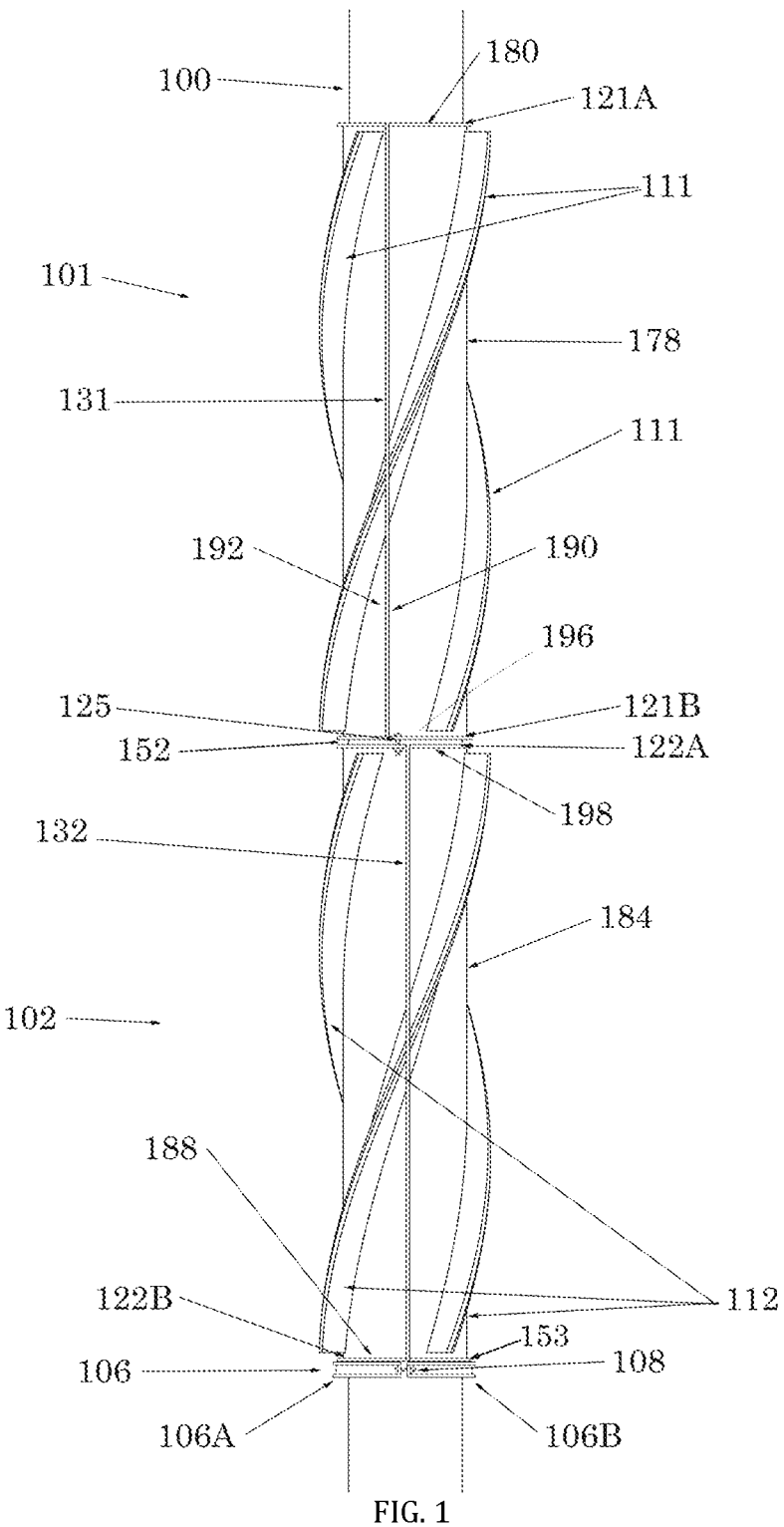
FIG. 1 illustrates one embodiment of a side view of two helical strakes that sit on top of a collar.

Referring now to the invention in more detail, FIG. 1 illustrates a side perspective view of a vortex induced vibration (VIV) suppression device. Representatively, in this embodiment, the VIV suppression device includes helical strakes 101 and 102, which are positioned around underlying tubular 100. Helical strake 101 may include a body portion 178, fins 111 extending radially outward from the body portion and gap 131 formed within body portion 178. Body portion 178 may be, for example, a sleeve having a cylindrical shape such that it can completely (or almost completely) encircle the underlying tubular 100. In this aspect, body portion 178 may have an inner diameter substantially the same as, or slightly larger than, the tubular 100, or other underlying structure, such that it fits round the tubular or other structure.

Fins 111 may have a substantially triangular cross-sectional shape as shown, however, other shapes may be suitable (e.g. circular, square, etc.). In addition, fins 111 may be helically arranged around body portion 178, and between the ends 180, 182 as shown. Fins 111 are important for providing effective suppression of VIV by disrupting the normal flow around tubular 100.

Gap 131 may be formed by opposing ends 190, 192 (which are interfacing in the illustrated embodiment) of body portion 178, and may be one continuous gap that extends from the top end 180 to the bottom end 196 of the sleeve, which forms body portion 178. Gap 131 may be formed entirely through body portion 178 such that body portion 178 can be opened along gap 131 and inserted around tubular 100, and then gap 131 may be brought back together once tubular 100 is positioned with body portion 178. In some embodiments, gap 131 may be considered an axial gap in that runs in an axial direction, and in some cases may be parallel to an axis of body portion 178. In other embodiments, gap 131 may run in an axial direction (e.g. from top end 180 to bottom end 196) but may be in a helical configuration, or otherwise not entirely parallel to the axis of body portion 178. In addition, it should be understood that although only one gap 131 is shown, strake 101 may have more than one gap, for example, two gaps, three gaps, four gaps, or more, which are defined by pairs or sets of opposing ends of body portion 178.

Similar to helical strake 101, helical strake 102 may include a body portion 184, fins 112 extending radially outward from body portion 184 and gap 132 extending from the top end 198 to the bottom end 188 of body portion 184, and which is defined by interfacing ends of body portion 184, as previously discussed.

Helical strake 101 may also include flange 121A at the top end 180 of body portion 178 and flange 121B at the bottom end 196 of body portion 178. Similarly, helical strake 102 may have a flange 122A at the top end 198 of body portion 184 and flange 122B at the bottom end 188 of body portion 184. Each of flanges 121A, 121B, 122A, 122B may be, for example, structures which encircle the ends of their respective body portions 178, 184, and extend radially outward form the surface of their respective body portions. In other words, the outer edges of flanges 121A, 121B, 122A, 122B have a greater diameter than the outer surface of their respective body portions 178, 184. In some embodiments, flanges 121A, 121B, 122A, 122B maybe substantially flat structures that create a lip around the body portions. Other non-planar shapes and sizes, for example, undulating structures, wavy structures, corrugated structures, non-continuous structures, and hollow structures, however, are also contemplated. For example, flanges 121A, 121B, 122A, 122B may include a flat portion with one or more appurtenances or out-of-plane regions extending therefrom to form a non-planar structure that mates with an adjacent flange (of a strake or collar) having a complimentary non-planar structure.

There may also be a strake gap 152 between helical strakes 101 and 102 that is maintained by flange fastener 125. Both helical strake 101 and helical strake 102 are maintained vertically by collar 106 consisting of collar half 106A and collar half 106B that are held together by collar fastener 108. Collar gap 153 between helical strake 102 and collar 106 is zero but shown since it does not have to be zero.

Again referring to FIG. 1, collar 106 is bolted tight against tubular 100 by using collar fastener 108. Helical strake 102 sits against collar 106 by gravity, but can be secured or fastened to collar 106 if desired. Helical strake 101 is bolted to helical strake 102 where flanges 121B and 122A meet using flange fastener 125. Thus, helical strake 101 and helical strake 102 are secured to each other and can be optionally secured to collar 106. Helical strakes 101 and 102 are restrained axially by collar 106 and can be restrained by an additional collar above helical strake 101 if desired. However, helical strakes 101 and 102 can be loose around tubular 100, so that they may slide down tubular 100, if collar 106 is not in place. In other words, an inner diameter of strakes 101 and 102 may be greater than an outer diameter of tubular 100, such that there is a gap between the two.

Still referring to FIG. 1, helical strake 102 may sit against collar 106 by gravity or by buoyant thrust, or may be attached to collar 106 by any suitable means. Helical strakes 101 and 102 may sit against each other by gravity or by thrust or may be locked together by any suitable means. Helical strakes 101 and 102 may also be locked together at flanges 121A, 121B, 122A, and 122B or at fins 111 and fins 112. Any number of axial gaps 131 and 132 may be present (i.e. helical strakes 101 and 102 may consist of any number of circumferential sections) and axial gaps 131 and 132 may be sufficiently small so that the opposing sides of helical strakes 101 and 102 contact each other (i.e. the gaps may be zero). In addition, in some cases, gaps 131 and 132 may also be helical or have any other shape that sufficiently splits helical strake 101 or helical strake 102 around their circumference. Secondary structures for attaching helical strakes 101 and 102 around tubular 100, such as bands or other fasteners, may also be used, however their normal function will be to cross the circumferential gaps 131 and 132 to keep the helical strakes 101 and 102 closed rather than preventing them from sliding (although sliding restraint is also an optional benefit of using secondary structures for attaching strakes 101 and 102 around tubular 100). If bands are used, they may pass over the strake fins 111 and 112, through slots in the strake fins 111 and 112, or through channels or other openings in the strake fins 111 and 112 (mixing or matching of these methods is also possible).

Any number of fins 111 and 112 may be present on the strakes. Fins 111 and 112 may terminate at the ends of helical strakes 101 and 102 as shown, or in some cases fins 111 and 112 may extend past the ends of helical strake 101 and 102 and be used for joining helical strakes 101 and 102 together instead of using flanges 121B and 122A. Fins 111 and 112 may be continuous or may be discontinuous along the helical strakes body.

Strake gap 152 may or may not be present (i.e. the strake gap 152 may be zero). Collar gap 153 may or may not be present (i.e. the strake gap 153 may be zero). Flanges 121A, 121B, 122A, and 122B may be of any suitable shape or size and may consist of a single segment that travels around the circumference of helical strakes 101 or 102 or may consist of one or more shorter segments along the circumference of helical strakes 101 or 102. Flanges 121A, 121B, 122A, and 122B may be separate structures that are attached to helical strakes 101 and 102 or may be molded as part of helical strakes 101 and 102. Multiple helical strakes may be used for a single collar 106 and multiple collars may be used to axially restrain helical strakes. Other appurtenances may be present for example appurtenances that assist with any of the attachments.

Still referring to FIG. 1, helical strake 101, helical strake 102, fins 111, fins 112, flange 121A, flange 121B, flange 122A, flange 122B, flange fastener 125, collar 106, and collar fastener 108 may be made of any suitable material including, but not limited to, metals, plastics, synthetics, elastomers, wood, fiberglass, and composites. Each component in the described system is not limited by geometry, quantity, type, or material. As a specific example, any number of flange fasteners 125 and collar fasteners 108 may be used and various types of fasteners may be used. In addition, one or more of the strake components may be optional, and in some embodiments, omitted. Typically adjacent helical strakes will be attached to each other, or to a collar, using bolt-type fasteners, but it is recognized that other fastener types such as clips, pins, clamps, serrated latch pins, rivets, cable ties, and rope may be used. In addition, the option for using various types of plastic welding, such as extrusion welding, hot gas welding, and speed tip welding, may be used to attach adjacent helical strakes or to attach a helical strake to a collar.

Figure 2:
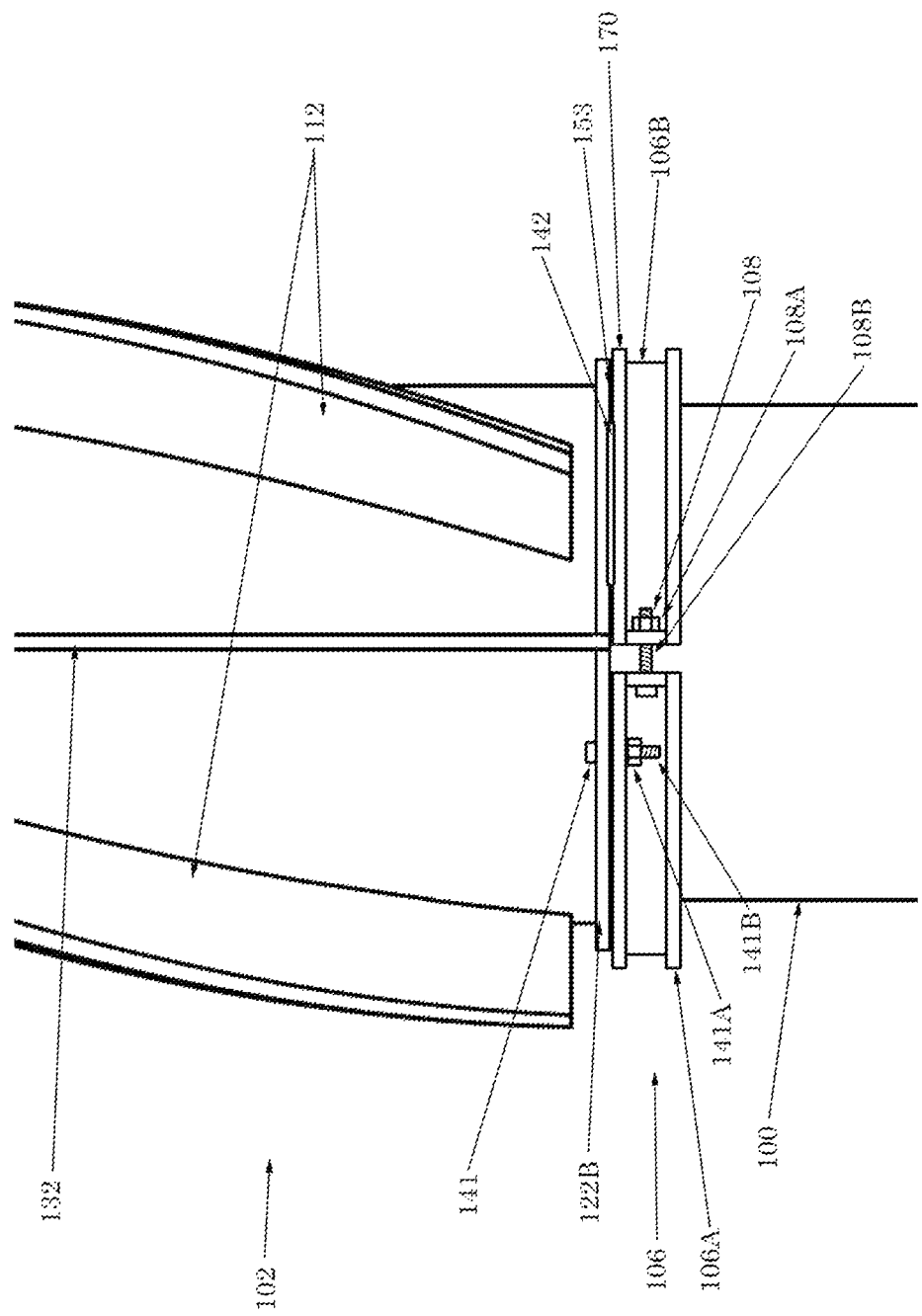
FIG. 2 illustrates one embodiment of a side view of the interface between a helical strake and a collar that are attached to each other but with a gap between them.

Referring now to FIG. 2, FIG. 2 illustrates a magnified side view of a collar 106 and the bottom of helical strake 102, as previously discussed in reference to FIG. 1. Strake 102 and collar 106 are shown positioned around on underlying tubular 100, and may be separated by collar gap 153. Collar 106 may include collar half 106A and collar half 106B, which are held together by collar fastener 108. Collar fastener 108 may be a nut 108A and bolt 108B. Helical strake 102 contains fins 112, flange 122B, and gap 132. Interface fastener 141 may include nut 141A and bolt 141B attaching flange 122B to collar 106. Weld 142 may also be used to attach flange 122B to collar 106.

Again referring to FIG. 2, this figure shows that a distance of collar gap 153 may be zero (i.e. no gap present) and that helical strake 102 may be attached to collar 106 by one or more means including by interface fastener 141 or by weld 142. Any number of interface fasteners 141 may be used to secure helical strake 102 to collar 106. Any number of welds 142 may be used to secure helical strake 102 to collar 106. Interface fastener 141 may be of any suitable fastener type such as bolts, nuts, screws, clips, pins, clamps, serrated latch pins, rivets, cable ties, and rope. Welds 142 may be of any suitable length. Methods for securing helical strake 102 and collar 106 may be mixed or matched as shown in FIG. 2, or a single method may be used. Interface fastener 141 or weld 142 may be positioned through, or between, the strake flange 122B and the collar flange 170 to hold the two together.

Figure 3:
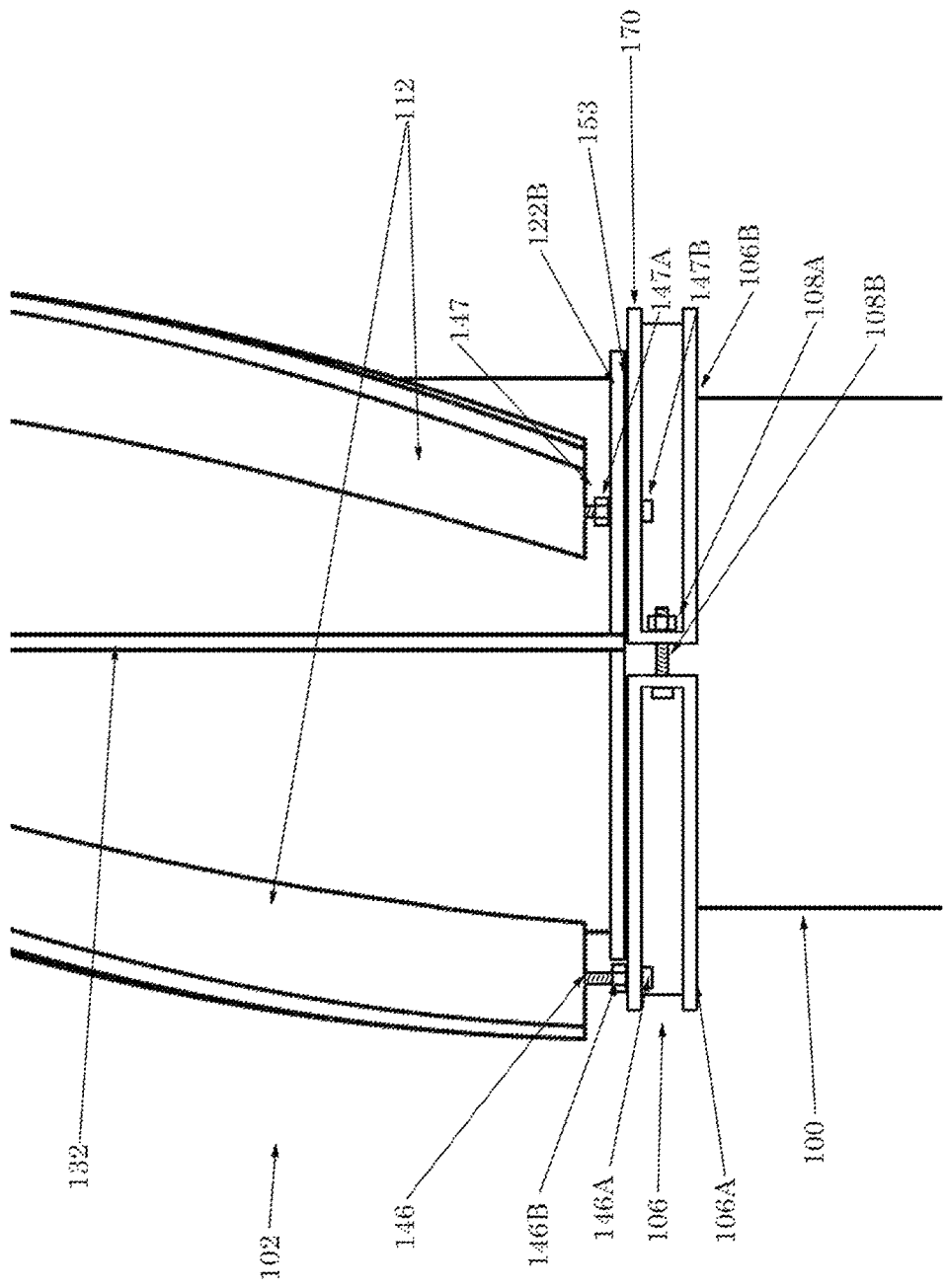
FIG. 3 illustrates one embodiment of a side view of the interface between a helical strake and a collar where the helical strake sits on top of appurtenances extending from the collar.

Referring now to FIG. 3, FIG. 3 illustrates a magnified side view of a collar 106 and the bottom of helical strake 102 of FIG. 1. Collar 106 and helical strake 102 are shown positioned on underlying tubular 100, with collar 106 and helical strake 102 separated by collar gap 153. Collar 106 may include collar half 106A and collar half 106B, which are held together by collar fastener 108. Collar fastener 108 may include a nut 108A and bolt 108B. Helical strake 102 may include fins 112, flange 122B, and gap 132. Coupling fastener 146 may include nut 146A and bolt 146B, while coupling fastener 147 may include nut 147A and bolt 147B.

Again referring to FIG. 3, FIG. 3 differs from the previous figures in that coupling fasteners 146 and 147 engage helical strake 102 through fins 112 (instead of just a strake flange 122B) to keep helical strake 102 from rotating about the underlying tubular 100. In particular, coupling fastener 146 is inserted through the flange 122B of collar 106 and into a helical strake fin 112 while coupling fastener 147 is inserted through a flange of collar 106 and also flange 122B before it enters a helical strake fin. Coupling fasteners 146 and 147 show that the fasteners may, or may not, travel through a helical strake flange, for example flange 122B.

Still referring to FIG. 3, any number of coupling fasteners 146 and 147 may be used to restrict the rotation of helical strake 102. For example, only one coupling fastener is required to restrict the rotation of helical strake 102 but multiple fasteners may be utilized if desired. Other means of restricting rotation of helical strake 102 may also be used such as pins, dowels, nails, and other appurtenances. Coupling fasteners 146 and 147 may be of any suitable size, shape, or material.

Figure 4:
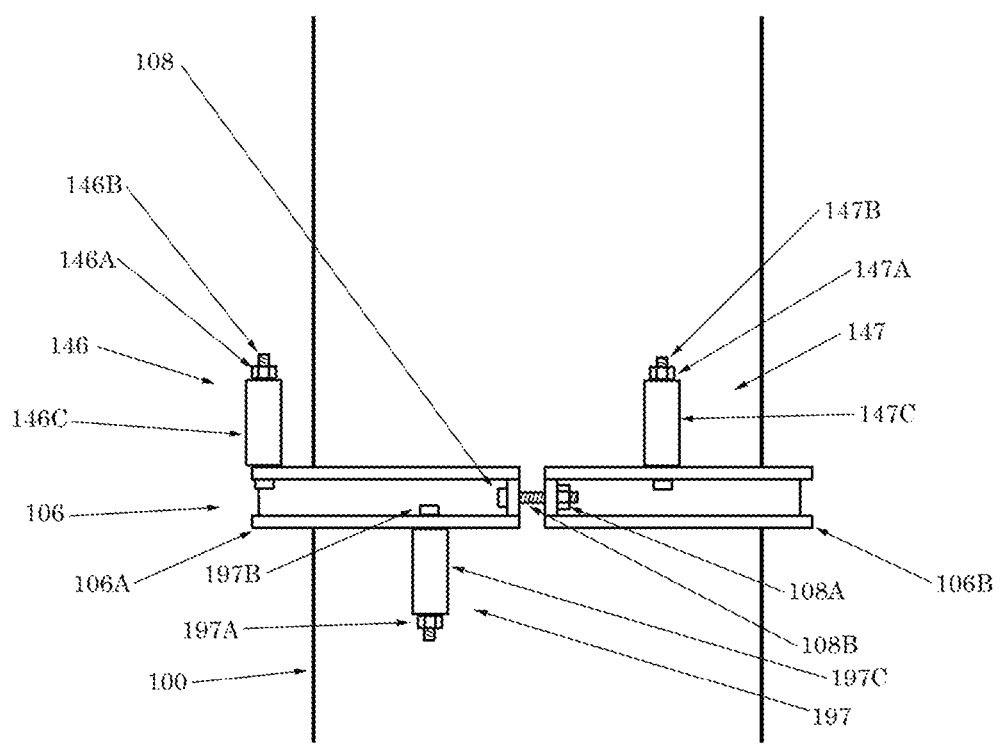
FIG. 4 illustrates one embodiment of a side view of a collar with appurtenances for receiving a helical strake.

Referring now to FIG. 4, FIG. 4 illustrates another embodiment in which collar 106, having collar half 106A and collar half 106B, is positioned on tubular 100. Collar half 106A and collar half 106B may be connected by collar fastener 108. Collar fastener 108 may include nut 108A and bolt 108B. In this embodiment, three coupling fasteners 146, 147, and 197 are shown. Coupling fastener 146 may include nut 146A, bolt 146B, and spacer 146C. Coupling fastener 147 may include nut 147A, bolt 147B, and spacer 147C. Coupling fastener 197 may include nut 197A, bolt 197B, and spacer 197C.

Again referring to FIG. 4, FIG. 4 illustrates: a) that coupling fasteners may extend in any direction to accommodate helical strakes that are both heavier and lighter than water (or the surrounding fluid medium since helical strakes can be used in other fluid mediums such as air); and b) spacers may be used to provide a better fit between the coupling fastener and the inside of the adjacent strake fin (or any other appurtenance present to receive the coupling fastener).

Still referring to FIG. 4, coupling fasteners 146, 147, and 197 may include any number of components and each component may be of any suitable size or shape and made of any suitable material. Any number of coupling fasteners may be used.

Figure 5:
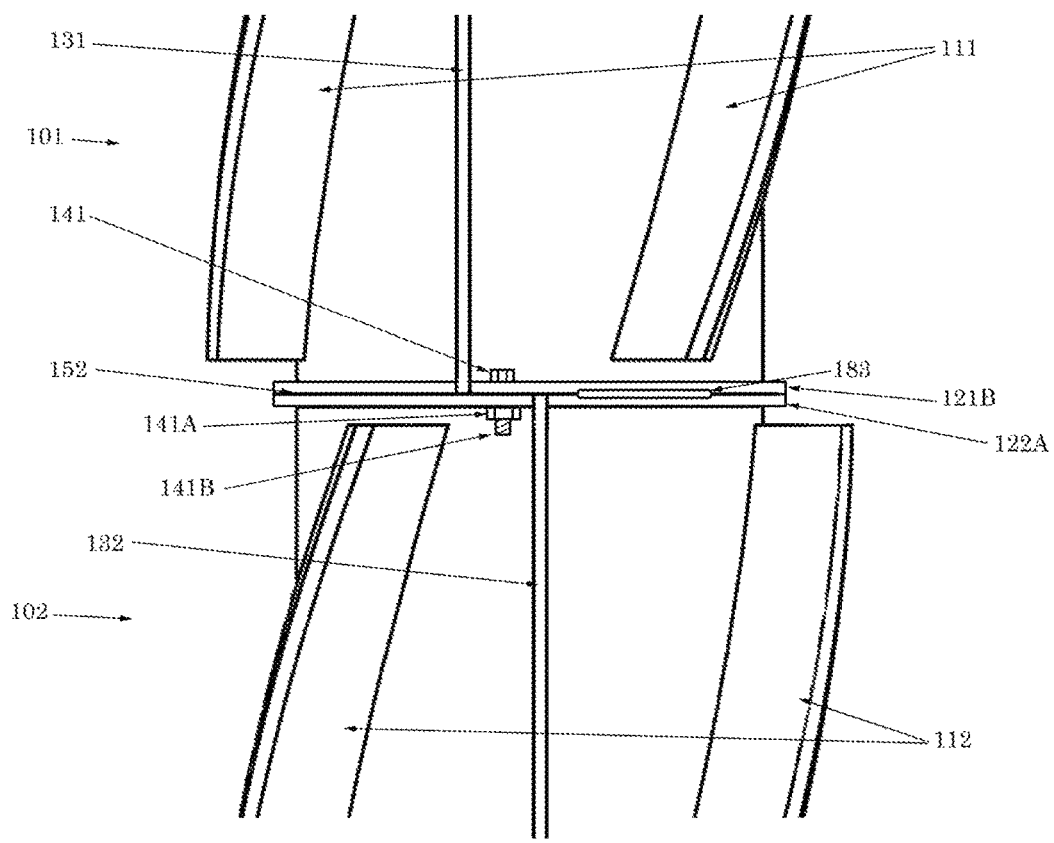
FIG. 5 illustrates one embodiment of a side view of the interface between a helical strake and a collar that are attached to each other without a gap between them.

Referring now to FIG. 5, FIG. 5 shows a magnified side view of helical strake 101 (having fins 111, gap 131, and flange 121B) and helical strake 102 (having fins 112, gap 132, and flange 122A), as previously discussed in reference to FIG. 1. Strake flanges 121B and 122A may be connected by flange fastener 141, which may include nut 141A and bolt 141B. Flange fastener 141, including nut 141A and bolt 141B, may be substantially the same as the previously discussed interface fastener 141, and therefore the flange and interface fasteners may be referred to interchangeably herein. Flanges 121B and 122A may also be connected by weld 183. Gap 152 separates flange 121B from flange 122A (in this drawing the flanges are in contact thus the gap is zero but it is important to note that gap 152 can be of any finite distance).

Again referring to FIG. 5, FIG. 5 illustrates various mechanisms that can be used to attach helical strake 101 to helical strake 102. Any number of flange fasteners 141 may be used and any number of welds 183 may be used. A single fastening mechanism such as flange fastener 141 or weld 183 may be used or more than one fastening mechanism may be used such as shown in FIG. 5. Weld 183 may include any number of segments of any desired length. Flange fastener 141 may have any number or type of components. Flange fastener 141 and its components as well as weld 183 may be made of any suitable material.

Figure 6:
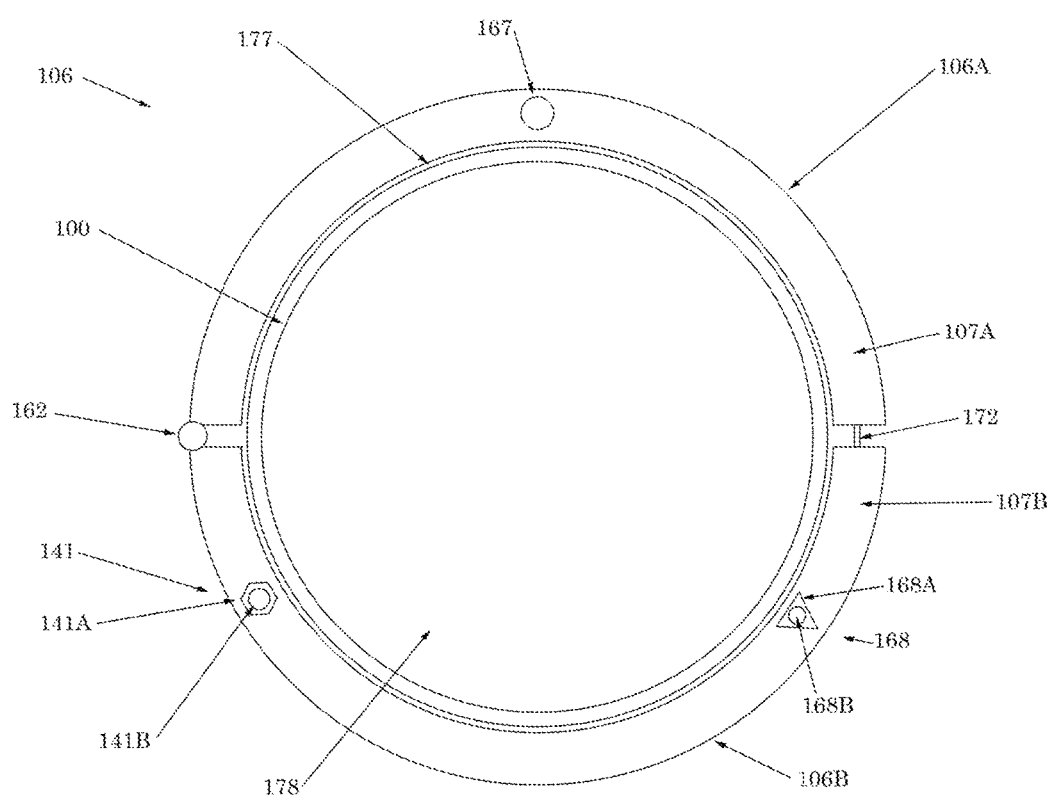
FIG. 6 illustrates one embodiment of a top view of a collar with a combination of openings and appurtenances for receiving a helical strake.

Referring now to FIG. 6, FIG. 6 illustrates a top plan view of collar 106, including collar half 106A and collar half 106B, surrounding tubular 100, as previously discussed in reference to FIG. 1. Collar half 106A may include collar flange 107A while collar half 106B has collar flange 107B. The two collar halves are connected by hinge 162 and collar bolt 172 so that, when collar bolt 172 is tightened, collar 106 will press tight against tubular 100 and reduce gap 177 to zero. Flange fastener 141 may include nut 141A and bolt 141B. Opening 167 extends through collar flange 107A. Flange fastener 168 has nut 168A and spacer 168B.

Again referring to FIG. 6, FIG. 6 shows various mechanisms for attaching the collar 106 to a helical strake, as previously discussed. The helical strake can be restrained from rotating using either flange fastener 141, flange fastener 168, or opening 167. Opening 167 requires an appurtenance on the helical strake that is inserted into opening 167.

Still referring to FIG. 6, opening 167 may be of any suitable size, shape or depth and any number of openings 167 may be present (or opening 167 may not be present or used at all). Any number of flange fasteners 141 may also be used as discussed above.

Figure 7:
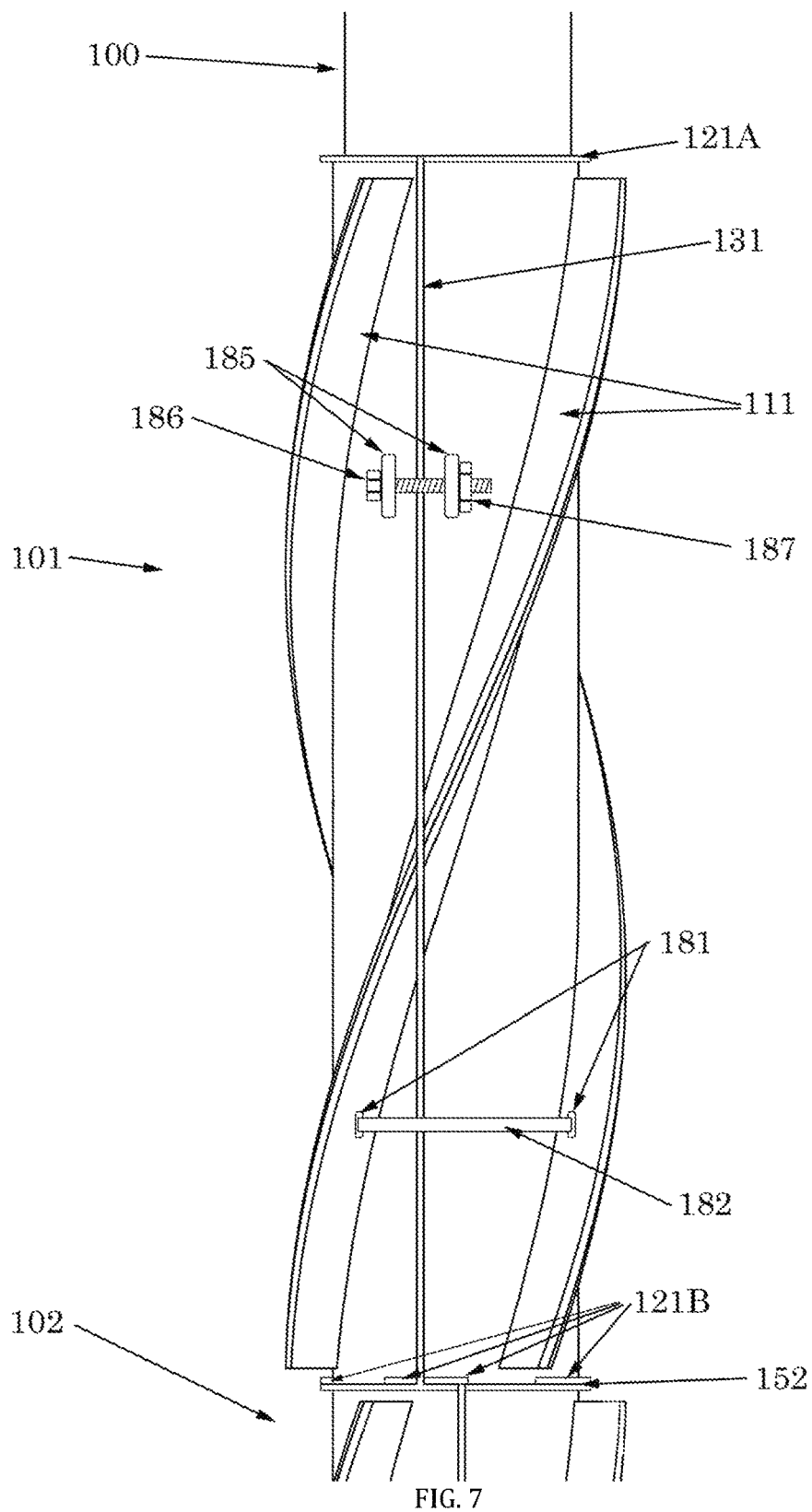
FIG. 7 illustrates one embodiment of a side view of a helical strake with mechanisms for closing or attaching the helical strake to the underlying tubular in one or more locations.

Referring now to FIG. 7, FIG. 7 is a side view of helical strake 101 adjacent to helical strake 102 and on tubular 100. Helical strake 101 has flanges 121A and 121B, gap 131, and fins 111, as previously discussed in reference to FIG. 1. In addition, in this embodiment, fins 111 of helical strake 101 may include openings 181. One or more of a band 182 may travel through each of openings 181. In addition, projections 185 are part of, or connected to, strake 101. Bolt 186 and nut 187 connect projections 185.

Again referring to FIG. 7, band 182 and bolt 186 are used to either: a) add structural support to helical strake 101 by keeping it closed and/or adjacent to tubular 100 or b) tighten helical strake 101 against tubular 100. Both band 182 and bolt 186 are optional. Projections 185 may be attached to helical strake 101 or molded into the body of helical strake 101. Any number of projections 185, bolt 186, nut 187, and band 182 may be used and each of these may have any suitable size, shape, or material.

Still referring to FIG. 7, other fastening mechanisms for securing helical strake 101 around tubular 100 may be used including, but not limited to clips, pins, clamps, serrated latch pins, rivets, cable ties, spring cords (such as bungee cords or shock cords), and rope.

Figure 8:
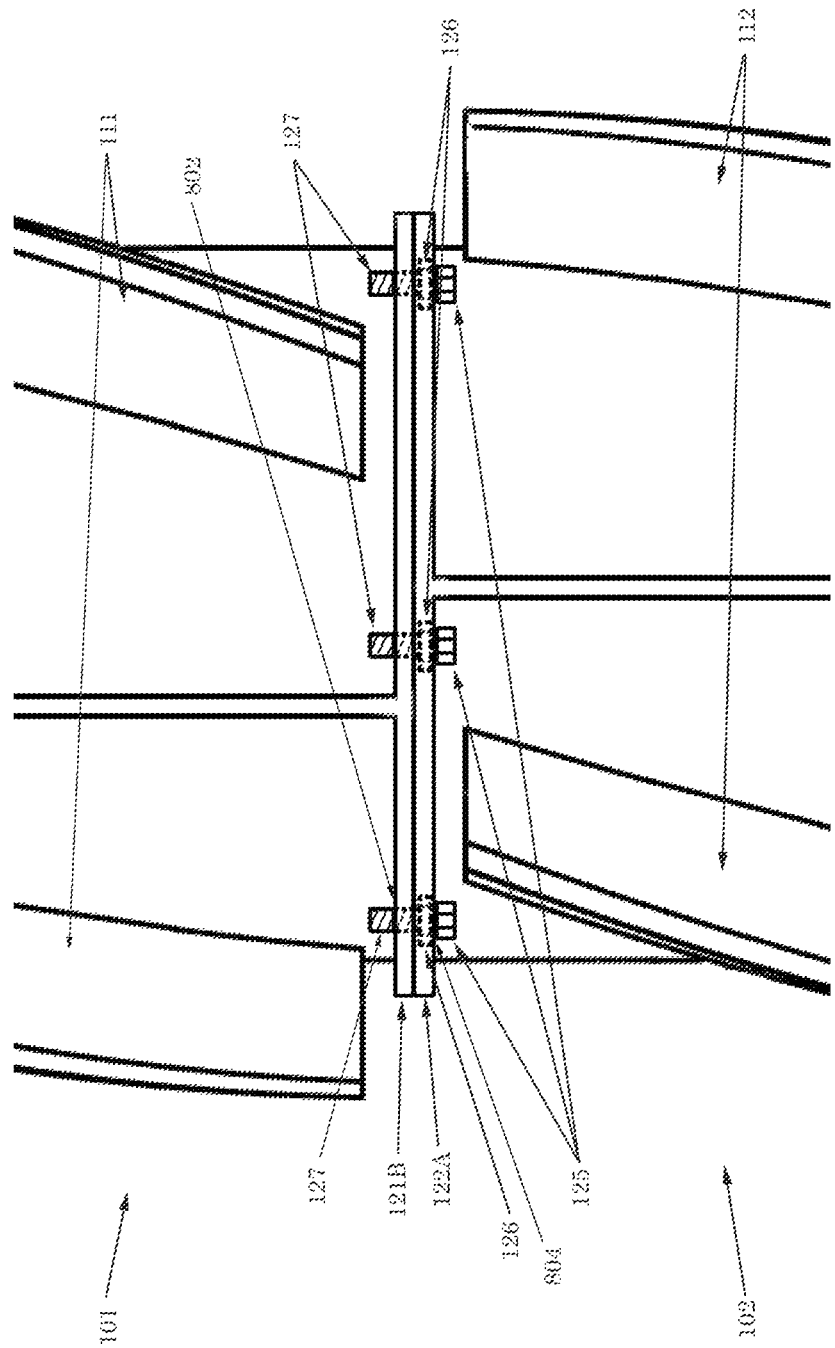
FIG. 8 illustrates one embodiment of a side view of the interface between two helical strakes with hollow flanges.

Referring now to FIG. 8, FIG. 8 shows a magnified side view of helical strake 101 (having fins 111 and flange 121B) and helical strake 102 (having fins 112 and flange 122A). As can be seen from this view, helical strake 101 and helical strake 102 are connected using flange fasteners 125, which are inserted through strake flanges 121B and 122A. Flange fasteners 125 may include flange bolts 127, which are inserted through openings in each of flanges 121B, 122A, and flange nuts 126. In some cases, flange nuts 126 may reside inside of the openings 802, 804, formed within flanges 121B and 122A, respectively. For example, in some embodiments, opening 802 or 804 may be a hollow interior area of flange 121B or 122A, and nuts 126 may be inserted, or embedded within, this hollow interior area.

Again referring to FIG. 8, any number of flange fasteners 125, flange bolts 127, and flange nuts 126 may be used to attach adjacent flanges such as flanges 121B and 122A. Flange bolts 127 and flange nuts 126 may be of any suitable length or diameter. Other fastener types such as clips, pins, clamps, serrated latch pins, rivets, cable ties, and rope may be used in addition to, or in place of, flange fasteners 125, flange bolts 127, or flange nuts 126. Flange nuts 126 may be simply screwed onto flange bolts 127. Flange nuts 126 may also be welded, clamped, or chemically bonded (or attached by any suitable means) to flange bolts 127 or to flange 121B. Similarly, flange bolts 127 may be welded, clamped, or chemically bonded (or attached by any suitable means) to flange 122A. Any number of flange nuts 126 may be used on a single flange bolt 127 and flange nuts 126 may reside inside of flanges (e.g., flange 122A) or outside of a flange. For example, one flange nut 126 may be used inside of flange 122A (as shown) to preinstall flange bolt 127 while a second flange nut 126 may be used on top of flange 121B to secure flange bolt 127 to helical strake 101. Flange bolts 127 may also extend into fins 111 or other appurtenances on helical strake 101. Flange fasteners 125, flange bolts 127, and flange nuts 126 may also be used for alignment and not necessarily for attaching adjacent flanges, since secondary methods may be used to keep helical strakes 101 and 102 onto tubular 100 (e.g. bands around helical strakes 101 and 102). It is expected that normally flange bolts 127 and flange nuts 126 will be installed prior to installation of the helical strakes 101 and 102 in order to minimize installation time. By preinstalling flange bolts 127 and flange nuts 126 then adjacent strakes may have pre-drilled holes in their receiving flange (in this case the receiving flange is 121B) and then simply placed over flange bolts 127. By installing collars at the end of each sequence of helical strakes then the helical strakes cannot slide off of flange bolts 127. Secondary attachment methods may also optionally be used such as cable ties, welding, or clamping of the adjacent flanges such as flanges 121B and 122A. Flanges 121B and 122A may consist of solid or hollow ring type structures as shown or may simply consist of discrete appurtenances (anything suitable for attaching to, or accepting flange bolts 127) on helical strake 101 or 102.

Figure 9:
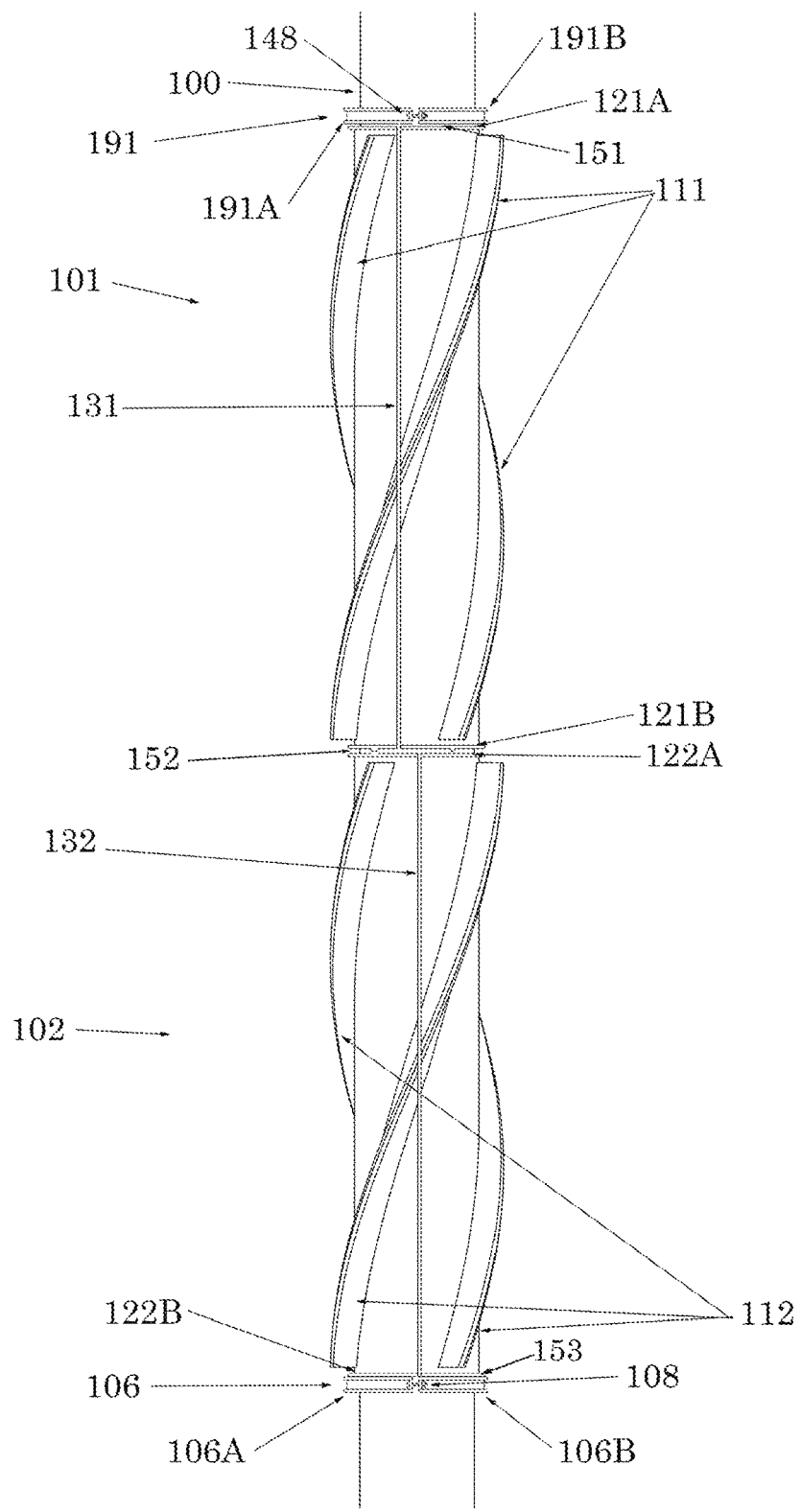
FIG. 9 illustrates one embodiment of a side view of two helical strakes with flanges surrounded by collars.

FIG. 9 illustrates a side perspective view of helical strakes 101 and 102 on tubular 100, including all of the features previously discussed in reference to FIG. 1. In this embodiment, however, in addition to a lower collar 106, an upper collar 191 is provided, which is at the end of helical strake 101, and surrounds tubular 100. Upper collar 191 is separated from helical strake 101 by axial gap 151 and is made up of halves 191A and 191B, which are connected by collar fastener 148. Collar 106 is separated from helical strake 102 by axial gap 153 and is made up of halves 106A and 106B, which are connected by collar fastener 108, as previously discussed in reference to FIG. 1. Axial gap 152 is the area between helical strake 101 and helical strake 102.

Figure 10:
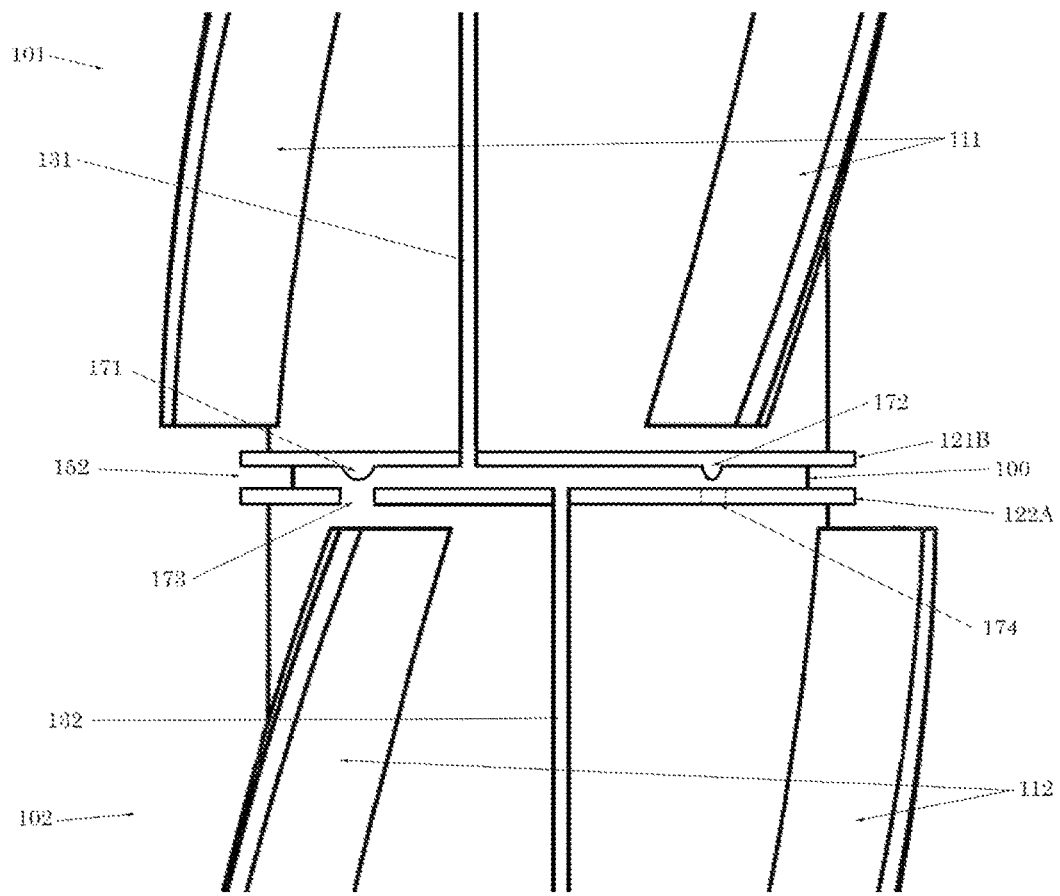
FIG. 10 is a magnified view of FIG. 9 showing the interface between two helical strakes with flanges and appurtenances on one helical strake for mating with an adjacent helical strake.

Referring now to FIG. 10, FIG. 10 illustrates a magnified side view of the area between helical strakes 101 and 102. Helical strake 101 has gap 131 and fins 111, together with flange 121B, while helical strake 102 has gap 132 and fins 112 together with flange 122A. Gap 152 is the area between helical strakes 101 and 102 and exposes the underlying tubular 100. In this embodiment, appurtenances 171 and 172 are further shown extending from the surface of flange 121B of strake 101, which faces strake 102. In addition, openings 173 and 174 are formed in flange 122A. Appurtenances 171 and 172 are positioned along flange 121B so that they align with openings 173 and 174, respectively, of flange 122A. In this aspect, appurtenances 171 and 172 may be inserted within, or otherwise received by, openings 173 and 174, to prevent rotation of strake 101 and strake 102 with respect to each other. For example, generally helical strake 101 is lowered onto helical strake 102 so that flanges 121B and 122A contact each other. This results in appurtenance 171 being inserted into opening 173 and appurtenance 172 being inserted into opening 174. The result is that helical strakes 101 and 102 are then restricted from rotating relative to each other. The idea is that if adjacent collars are installed against the helical strakes when they are in this locked position, and if each section of helical strake 101 is attached to an appropriate section of helical strake 102 and vice versa, then helical strakes 101 and 102 are fixed onto tubular 100 and cannot rotate, slide or come off due to the ocean current.

Appurtenances 171 and 172 may be of any suitable shape, size, and quantity, and may be molded into helical strake 101 or may be attached separately. Appurtenances 171 and 172 may be part of flange 121B, part of the strake body itself (the part that is between fins 111 and not part of any flanges), or part of fins 111 (thus appurtenances 171 and 172 are not necessarily part of flanges 121B). Similarly, openings 173 and 174 may be of any suitable size, shape, and quantity but will generally be designed to accept appurtenances from an adjacent helical strake. Openings 173 and 174 may be in flange 122A, the strake body of helical strake 102, in fins 112, or part of other appurtenances on helical strake 102 (these appurtenances may be molded into helical strake 102 or attached separately). Flanges 121B and 122A may also be molded in structures or separate structures that are made for facilitating connection of helical strake 101 to helical strake 102. Gap 152 may generally be relatively small but may exist provided there are fasteners or appurtenances on helical strake 101 that mate with openings of helical strake 102. For example, appurtenance 171 may be lowered only partially into opening 173 and provide a suitable restraint while leaving a small gap 152. Flanges 121B and 122A may also be V-shaped, wavy, or of discrete segments (they do not have to extend all of the way around the helical strake or even all of the way between adjacent fins) that extend somewhat vertically as well as horizontally (as depicted in FIG. 10) or may have openings to accept an adjacent V-shaped, wave, or other appropriate geometry that extends vertically (even blade type structures) to that flange 121B may be mated with flange 122A in any suitable manner. The various flange shapes may be molded in or added after molding. In general, flanges 121B and 122A may be of any suitable shape or have any suitable appurtenance that allows them to mate together in a way that restricts one or more degrees of freedom.

Still referring to FIG. 10, appurtenances 171 and 172 may be made of any suitable material including, but not limited to, plastic, metal, fiberglass, composite, synthetic, wood, and ceramic. Materials may be mixed and matched and each appurtenance may be made of more than one material and each appurtenance may be made of different materials than other appurtenances.

Figure 11:
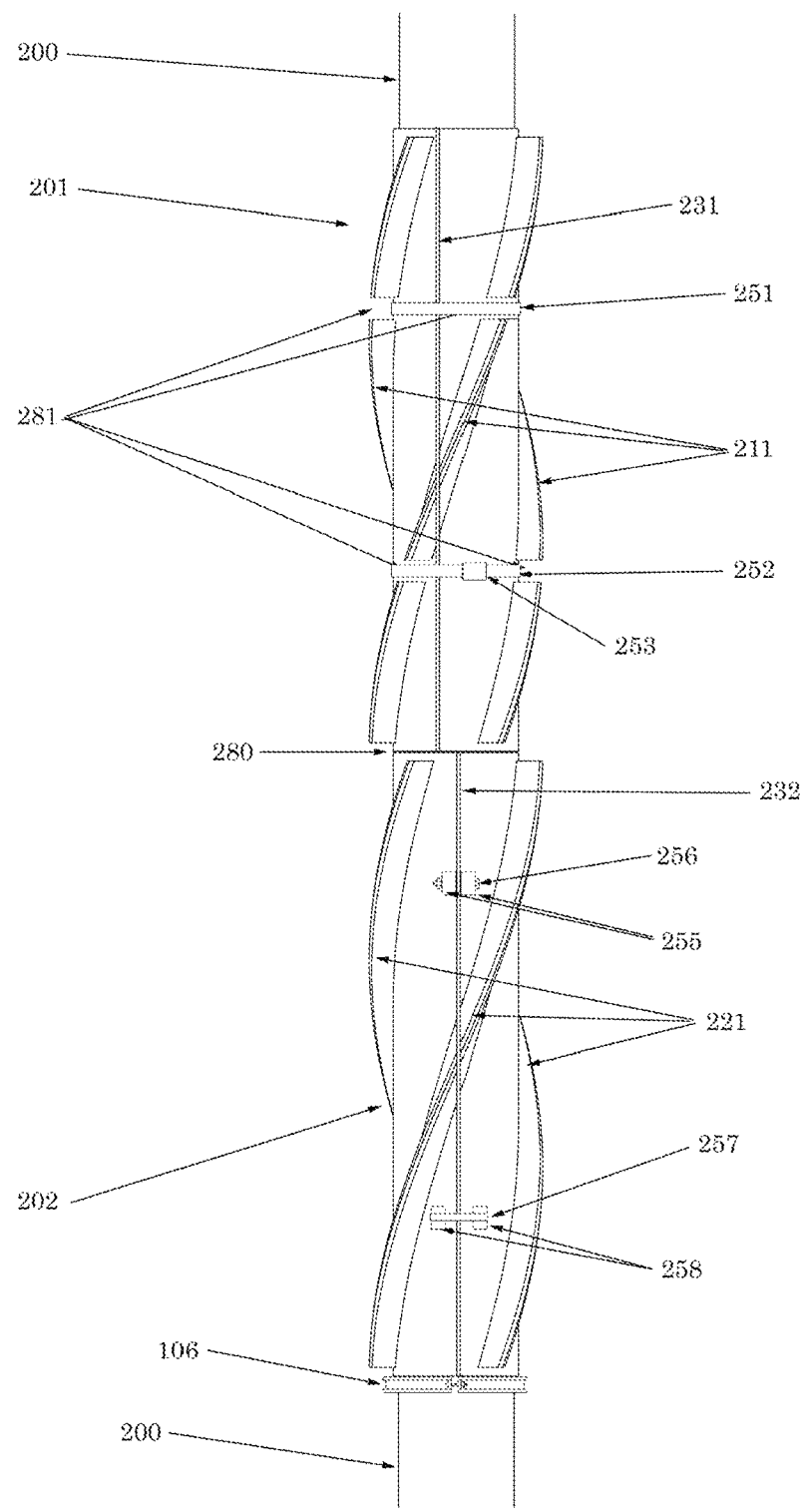
FIG. 11 illustrates one embodiment of a side view of two helical strakes above a collar without flanges.

Referring now to FIG. 11, this figure shows helical strakes 201 and 202 on tubular 200 and adjacent to collar 106 which is tight against tubular 200. Helical strake 201 has gap 231 and fins 211 while helical strake 202 has gap 232 and fins 221. Helical strake 201 is closed around tubular 200 (across gap 232) using band 251 and band 252, which may include buckle 253. For example, buckle 253 may be attached to band 252 (and in some cases band 251) and be used to help close band 252, and in turn strake 201 around tubular 200. In this aspect, buckle 253 may be attached to one end of band 252, and an opposing end of band 252 may be inserted into buckle 253 to hold the ends together. In other embodiments, buckle 253 may have, for example, a clasp attached to one end of the band 252, and a member for receiving the clasp at another end of the band 252, and the clasp is inserted into the receiving member to hold the band together. The buckle 253 may further facilitate tightening of band 252 around strake 201, by hand or using a handle tool suitable for tightening band 252. In this aspect, band 252 may be considered adjustable in that its circumference can be changed to either tighten or loosen it around strake 201 using buckle 253.

Helical strake 202 may be closed around tubular 200 using fastener 256 and blocks 255 and also using cable tie 257 and blocks 258. Blocks 255 and blocks 258 may be, for example, pairs of blocks (or block like structures) that are attached to the outer surfaces of each of strakes 201, 202, along opposing sides of gaps 231, 232. In this aspect, when the strake halves are positioned around tubular 200 as shown, blocks 255 align with each other and blocks 258 align with each other. Blocks 255 and blocks 258 may further include openings, receiving portions, or the like, through which fastener 256 and/or cable tie 257 can be inserted to secure the blocks together, and in turn close strakes 201, 202 around tubular 100. Helical strakes 201 and 202 may be separated by axial gap 280. Fins 211 may also have gaps 281, which are dimensioned to accommodate bands 251, 252.

Again referring to FIG. 11, collar 106 may serve as the primary mechanism keeping helical strake 202 from sliding downward along tubular 200, while fastener 256 and cable tie 257 are used to close helical strake 202 around tubular 200. Helical strake 202 then provides the primary mechanism keeping helical strake 201 from sliding downward along tubular 200 (ultimately restrained by collar 106). Bands 251 and 252 may be used to keep helical strake 201 closed around tubular 200, as previously discussed. An upper collar, such as is shown in FIG. 9, may also be present but is not shown here for purposes of simplicity. Gaps 281 are shown with bands 251 and 252 going through them but may, or may not, have bands passing through them.

Still referring to FIG. 11, any number of bands 251 and 252 may be present and the bands may be closed using buckle 253 or any other suitable structure such as clips or welds. Similarly any number of fasteners 256 or cable ties 257 may be used across gap 232 along with any number of blocks 255 and 258. Bands 251 and 252, fasteners 256, and cable ties 257 may be of any suitable size, shape and quantity and they may be mixed and matched on a single helical strake or group of helical strakes. Other types and methods of attachment may be used in conjunction with, or in place of, fasteners 256, cable ties 257, band 251, and band 252 including, but not limited to, bolts, screws, serrated pins, locking pins, springs, staples, rivets, cable ties, bands, chemical bonding, and welding. Blocks 255 and 258 may be of any suitable size, shape, and quantity and may be molded into helical strake 202 (or helical strake 201) or may be attached separately. Gaps 281 may be of any suitable size, shape, or quantity. Gaps 281 may also house springs or other structures.

Still referring to FIG. 11, bands 251 and 252, buckle 253, blocks 255, blocks 258, fastener 256, cable tie 257, and any other fastening structures may be made of any suitable material including, but not limited to, plastic, metal, fiberglass, composite, synthetic, wood, and ceramic. Materials may be mixed and matched and each structure may be made of more than one material and each structural component may be made of different materials than other structures or structural components.

Figure 12:
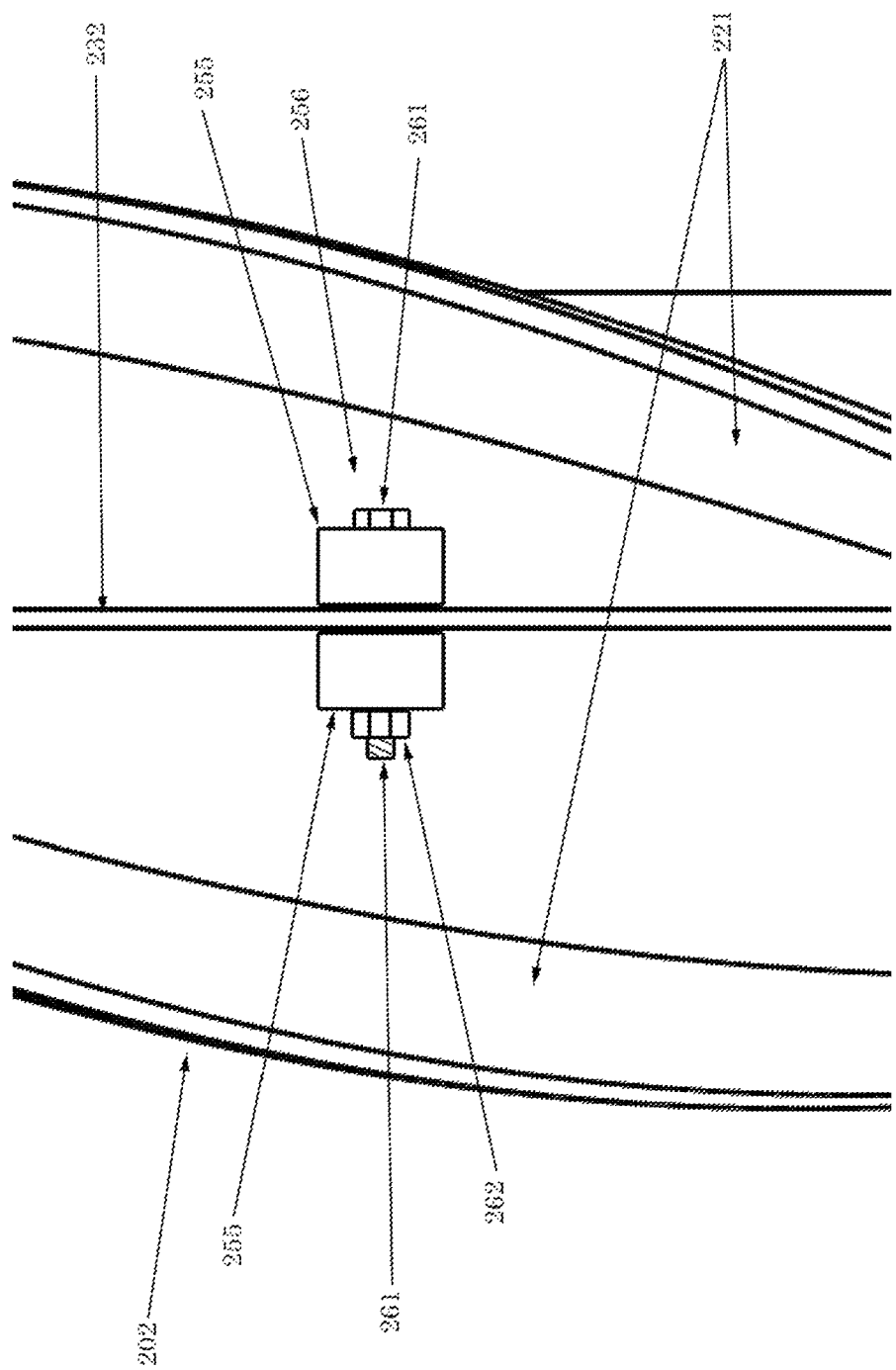
FIG. 12 illustrates a magnified view of appurtenances for bolting across a gap in the strake body of FIG. 11.

Referring now to FIG. 12, FIG. 12 illustrates a magnified side view of fastener 256 and blocks 255 as part of helical strake 202, described in reference to FIG. 11. In this embodiment, fastener 256 is shown including bolt 261 and nut 262. Bolt 261 is shown inserted through blocks 255, which are aligned along gap 232, and nut 262 inserted at the end of bolt 261, to hold strake 202 together.

Again referring to FIG. 12, bolt 261 and nut 262 may be of any suitable size, shape, and quantity. As noted above, other types of fasteners or methods of attachment may be substituted for bolts 261 and nut 262. Bolt 261 and nut 262 may be made of any suitable material. Blocks 255 may have other structures attached to them or molded into them and may have openings or other appurtenances to assist with supporting bolt 261, nut 262, or other attachment methods. Blocks 255 may be placed in any location on helical strake 202 and may extend into gap 232 or be well away from gap 232.

Figure 13:
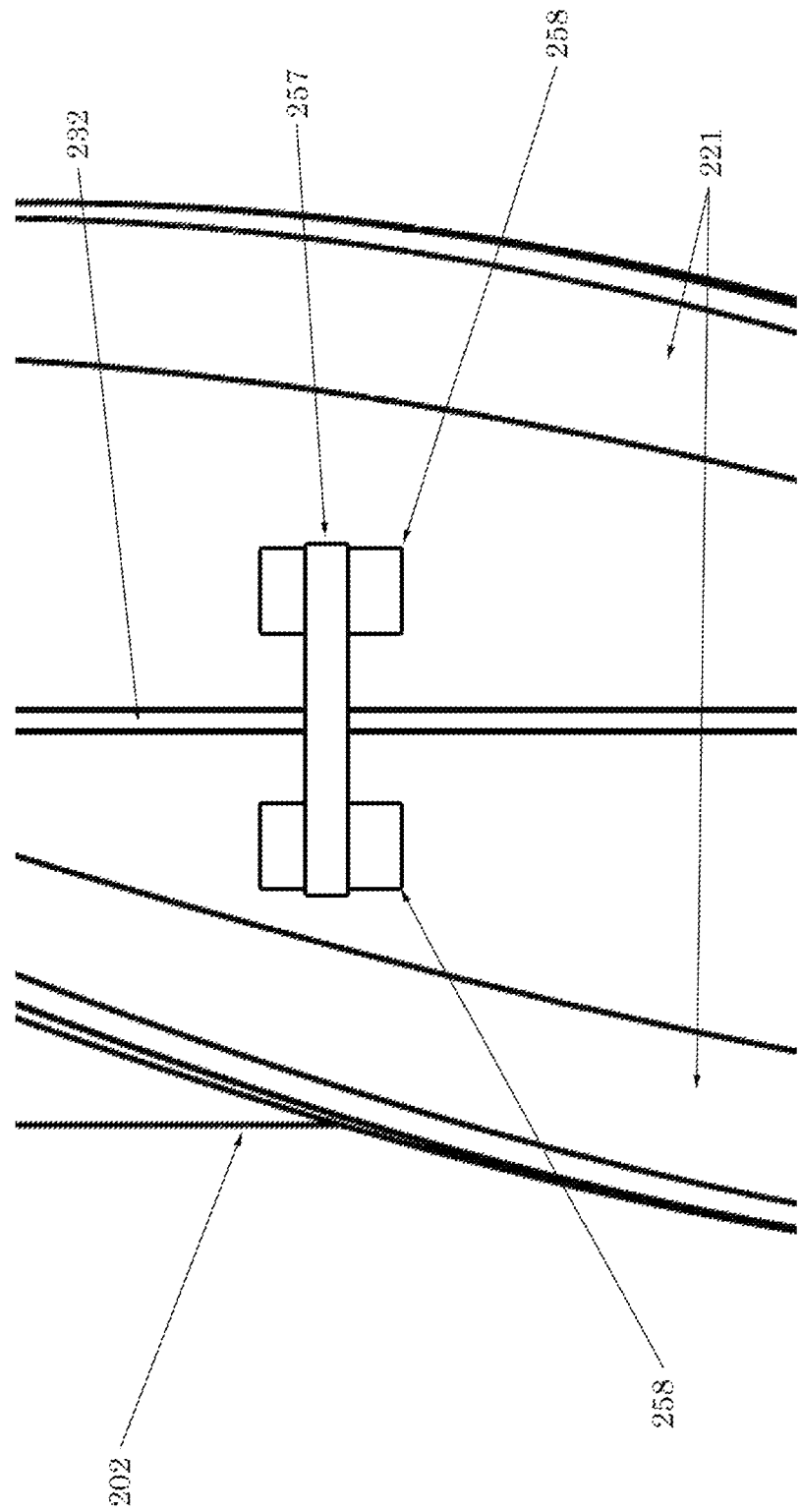
FIG. 13 illustrates a magnified view of appurtenances for banding across a gap in the strake body of FIG. 11.

Referring now to FIG. 13, FIG. 13 illustrates a magnified side view of blocks 258 and cable tie 257 on helical strake 202, described in reference to FIG. 11. Fins 221 and gap 232 are also shown. From this view, it can be seen that the pair of blocks 258 are positioned on opposite sides of strake 202, and held together using cable tie 257. Cable tie 257 may be of any suitable size, shape, or quantity. As noted above, other fasteners or methods of attachment may be substituted for cable tie 257 but it should also be noted that other bands or band type structures and cable tie types may be used in conjunction with, or in place of, cable tie 257. Cable tie 257 may be of any suitable material. Blocks 258 may have other structures attached to them or molding into them and may have openings or other appurtenances to facilitate the use of cable tie 257 or other attachment methods. Blocks 258 may be placed in any location on helical strake 202 and may extend into gap 232 or be well away from gap 232.

Figure 14:
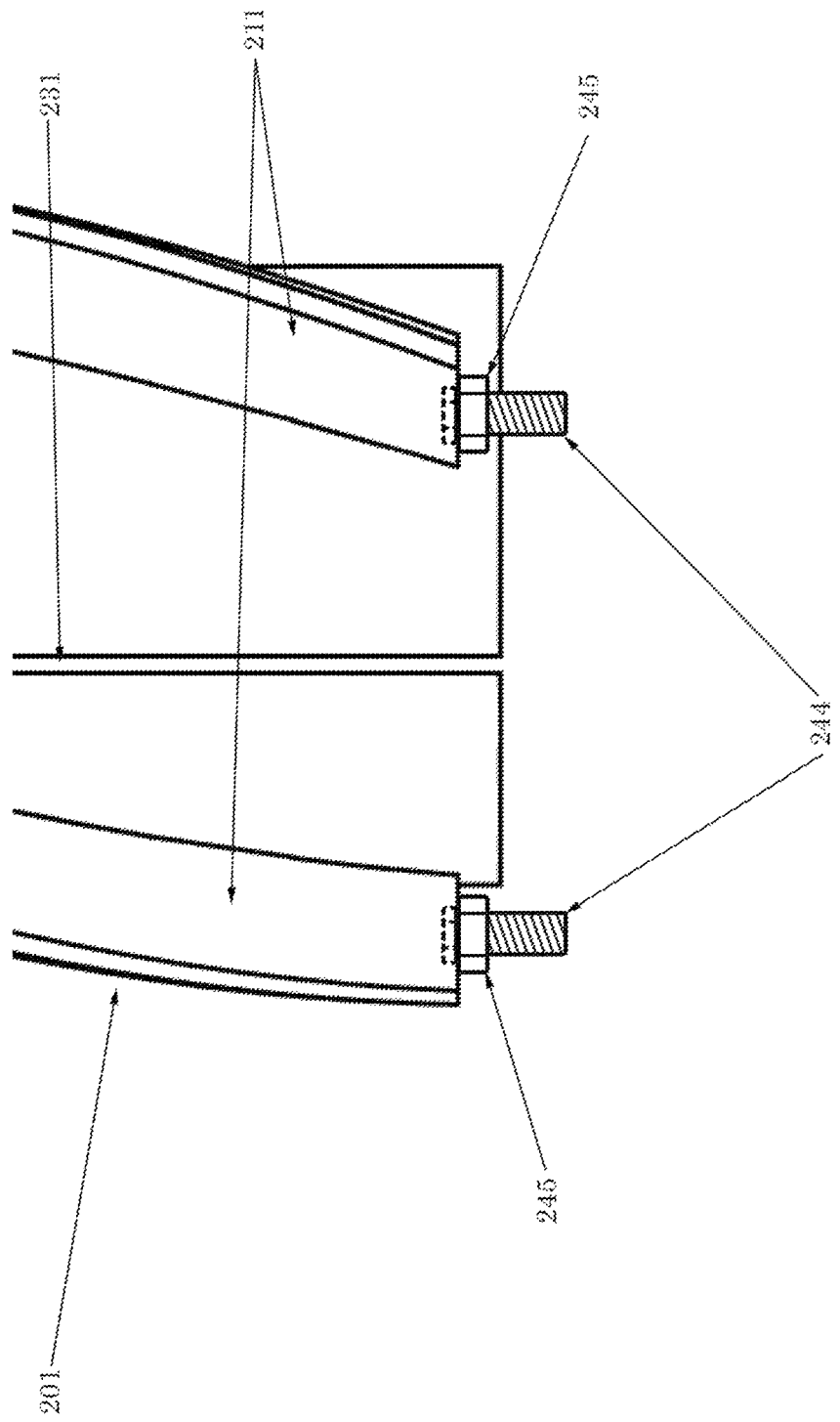
FIG. 14 illustrates a magnified view of fasteners in the fins of a helical strake body for interfacing with an adjacent helical strake body.

Referring now to FIG. 14, FIG. 14 illustrates a magnified side view of an end of strake 201, described in reference to FIG. 11. The end of helical strake 201 is shown with portions of fins 211 and gap 231. Bolts 244 are attached to the ends of fins 211 using nuts 245.

Again referring to FIG. 14, bolts 244 extend downward for interfacing with an adjacent helical strake (e.g., strake 202). Bolts 244 can extend into any of a number of possible openings in the adjacent helical strake, including the fins, a flange, or appurtenances that are on the outside of inside of the helical adjacent strake. In this aspect, bolts 244 may be used to restrict rotation of the adjacent helical strake around the longitudinal axis of an underlying tubular. In addition, or alternatively, nuts 245 or additional nuts (or other clamping devices including, but not limited to, clamps, pins, rivets, and welding) can also be used to rigidly attach fins 211 to a structure on the adjacent helical strake. Bolts 244 can also be used to interface with an adjacent collar instead of an adjacent helical strake. Bolts 244 can also traverse through an adjacent collar and into a structure on a helical strake that is adjacent to the collar (so that the collar is between the two helical strakes).

Still referring to FIG. 14, any number of bolts 244 may be used and each fin 211 may have a bolt 244 present or may not have a bolt 244 present. A single fin 211 may have more than one bolt 244 or nut 245 present. Bolts 244 may be welded to fins 211 so that nut 245 may be optional. Bolts 244 may also use other methods of attachment to fins 211 including, but not limited to, pinning, tying (with rope, cable ties, etc.), and clamping. Bolts 244 and nuts 245 may be made of any suitable material.

Figure 15:
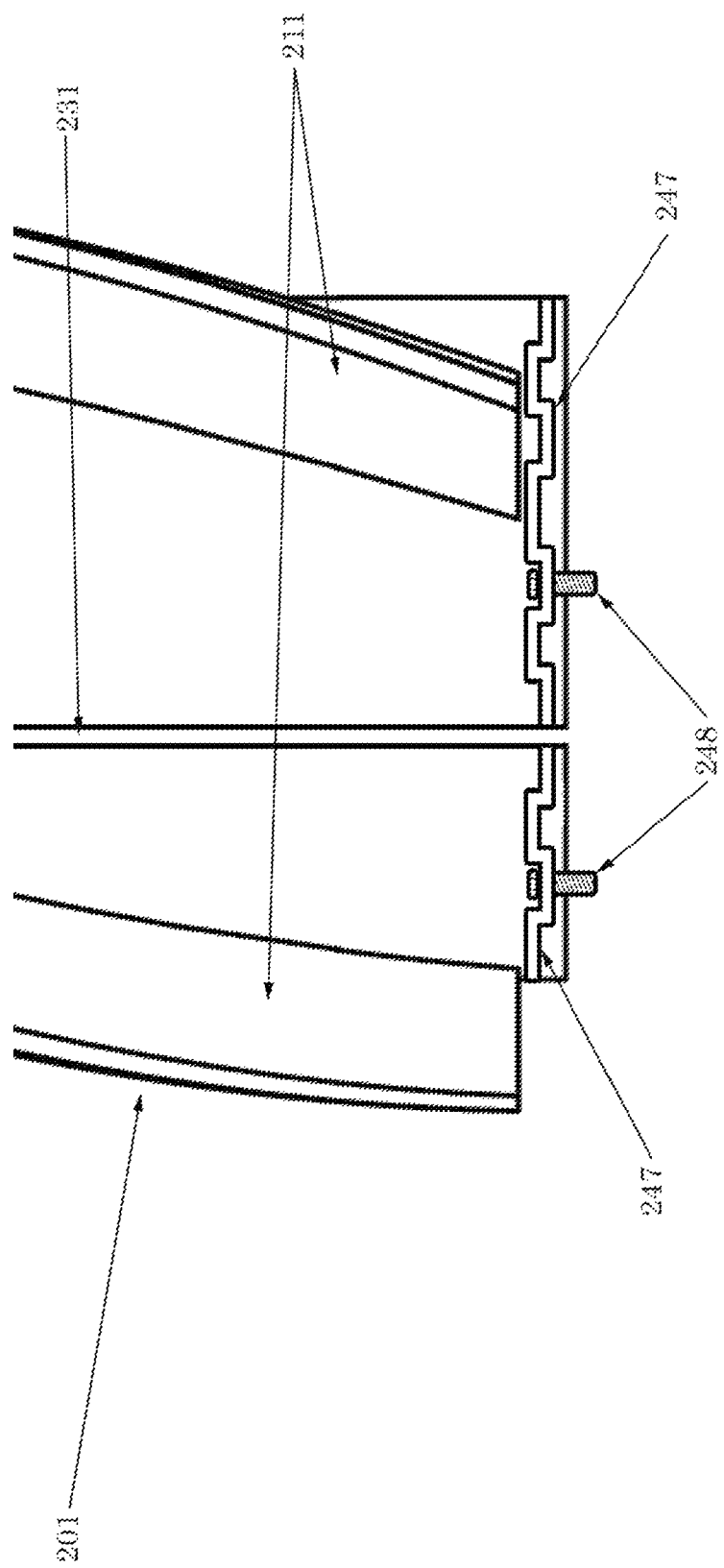
FIG. 15 illustrates a magnified view of a one embodiment of a flange geometry with optional fasteners for interfacing with an adjacent helical strake body.

Referring now to FIG. 15, FIG. 15 shows a magnified end of helical strake 201 having fins 211, gap 231 and flange 247. Flange 247 may be attached to helical strake 201. Bolts 248 may be inserted through flange 247. Bolts 248 may be held in place by nuts (not shown) that are inside or outside of flange 247. Bolts 248 may extend downward and may interface with an adjacent helical strake (e.g., strake 202). Bolts 248 can extend into any of a number of possible openings in the helical adjacent strake including the fins, a flange, or appurtenances that are on the outside of inside of the helical adjacent strake. In this aspect, bolts 248 can be used to restrict rotation of the adjacent helical strake around the longitudinal axis of an underlying tubular. In addition, nuts on bolts 248 (or other clamping devices including, but not limited to, clamps, pins, rivets, and welding) can also be used to rigidly attach the helical strake to an adjacent helical strake.

Still referring to FIG. 15, bolts 248 are optional in that flange 247 can be located at the bottom of helical strake 201 and interface with a mating flange of an adjacent helical strake and thus restrict the rotation of that strake around the longitudinal axis of the underlying tubular. Any number of bolts 248 may be used as well as any number of other common associated fastening hardware such as nuts and washers.

Flange 247 may have any geometrical shape that can mate with a flange or other appurtenances of an adjacent helical strake. For example, flange 247 may have a sinuous or waveform like shape as shown in FIG. 15, and which may be complimentary to a flange on an adjacent strake (e.g., strake 202). In some embodiments, flange 247 is one continuous structure that travels along the entire circumference of helical strake 201. In other embodiments, flange 247 may be in discrete segments, not travel around the entire circumference of helical strake 201, or may not travel the entire distance between two adjacent fins 211. Flange 247 may be molded into helical strake 201 or may be a separate structure that is attached to helical strake 201 by any suitable means including, but not limited to, fastening, welding, riveting, and clamping. Flanges on adjacent helical strakes or on a helical strake and an adjacent collar may be coupled by any suitable means including, but not limited to, fasteners, bolts, screws, nuts, cable ties, rope, clamps, rivets, and welding. Bolts 248 and flange 247 may each be made of any suitable material.

Figure 16:
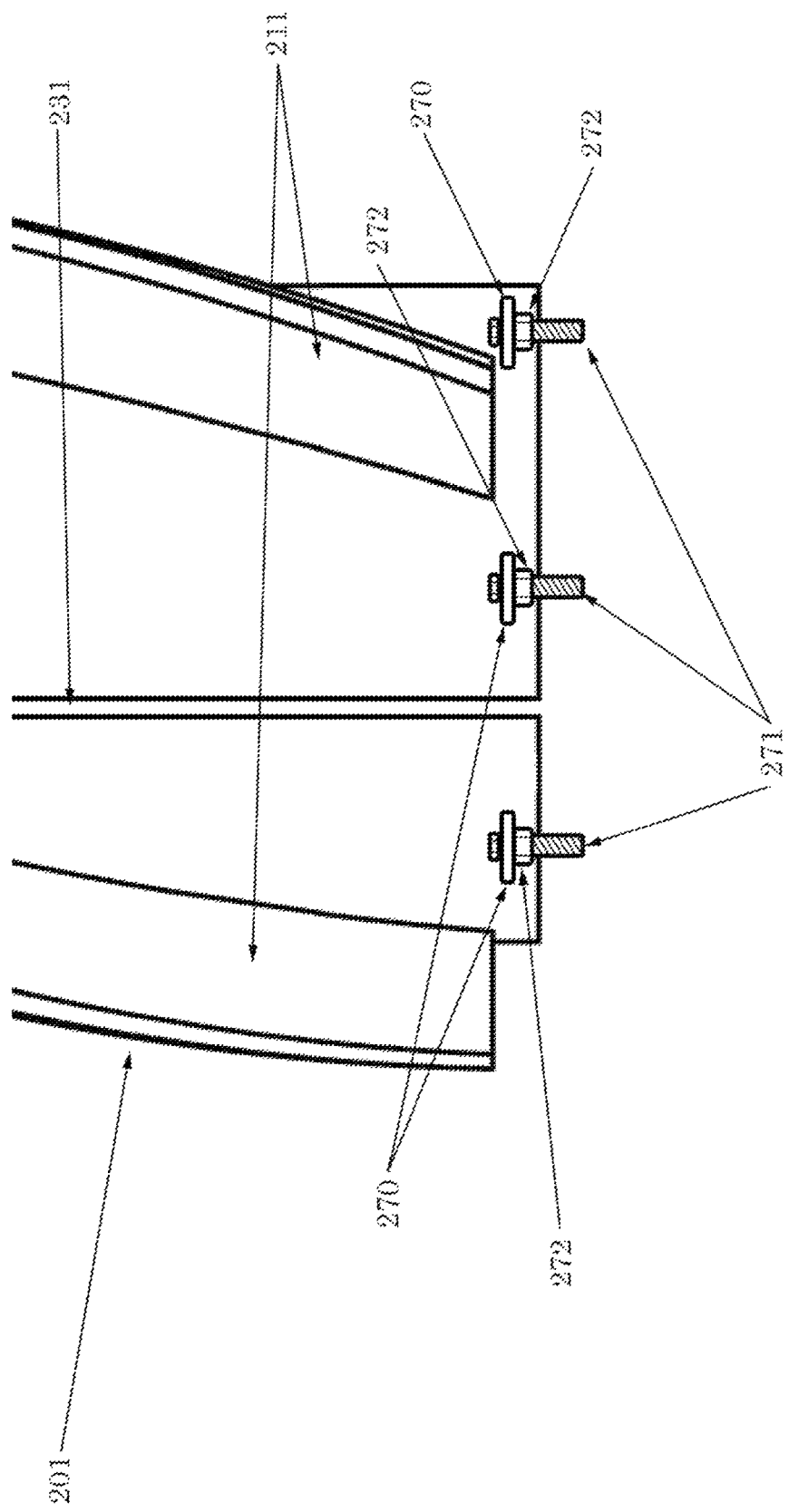
FIG. 16 illustrates a magnified view of fasteners attached to tabs in a helical strake body for interfacing with an adjacent helical strake body.

Referring now to FIG. 16, FIG. 16 is a magnified end view of helical strake 201 having fins 211 and gap 231. In this embodiment, strake 201 is shown further including laterally or horizontally extending tabs 270, which protrude outwardly from the surface of strake 201. Bolts 271 are attached to tabs 270 by use of nuts 272. Bolts 271 extend downward for interfacing with an adjacent helical strake (not shown) or collar (or both). Bolts 271 can extend into any of a number of possible openings in the adjacent helical strake including the fins, a flange, or appurtenances that are on the outside of inside of the helical adjacent strake. In this aspect, bolts 271 may be used to restrict rotation of the adjacent helical strake around the longitudinal axis of an underlying tubular. In addition, or alternatively, nuts 272 on bolts 271 (or other clamping devices including, but not limited to, clamps, pins, rivets, and welding) can also be used to rigidly attach the helical strake to an adjacent helical strake.

Tabs 270 may be molded into helical strake 201 or may be separate structures that are attached to helical strake 201 by any suitable means including, but not limited to, fastening, welding, riveting, and clamping. Any number of tabs 270 and bolts 271 may be used and any number of nuts 272 may be used on bolts 271 or bolts 271 may be attached to tabs 270 by any suitable means. Bolts 271, nuts 272, and tabs 270 may each be made of any suitable material.

Figure 17:
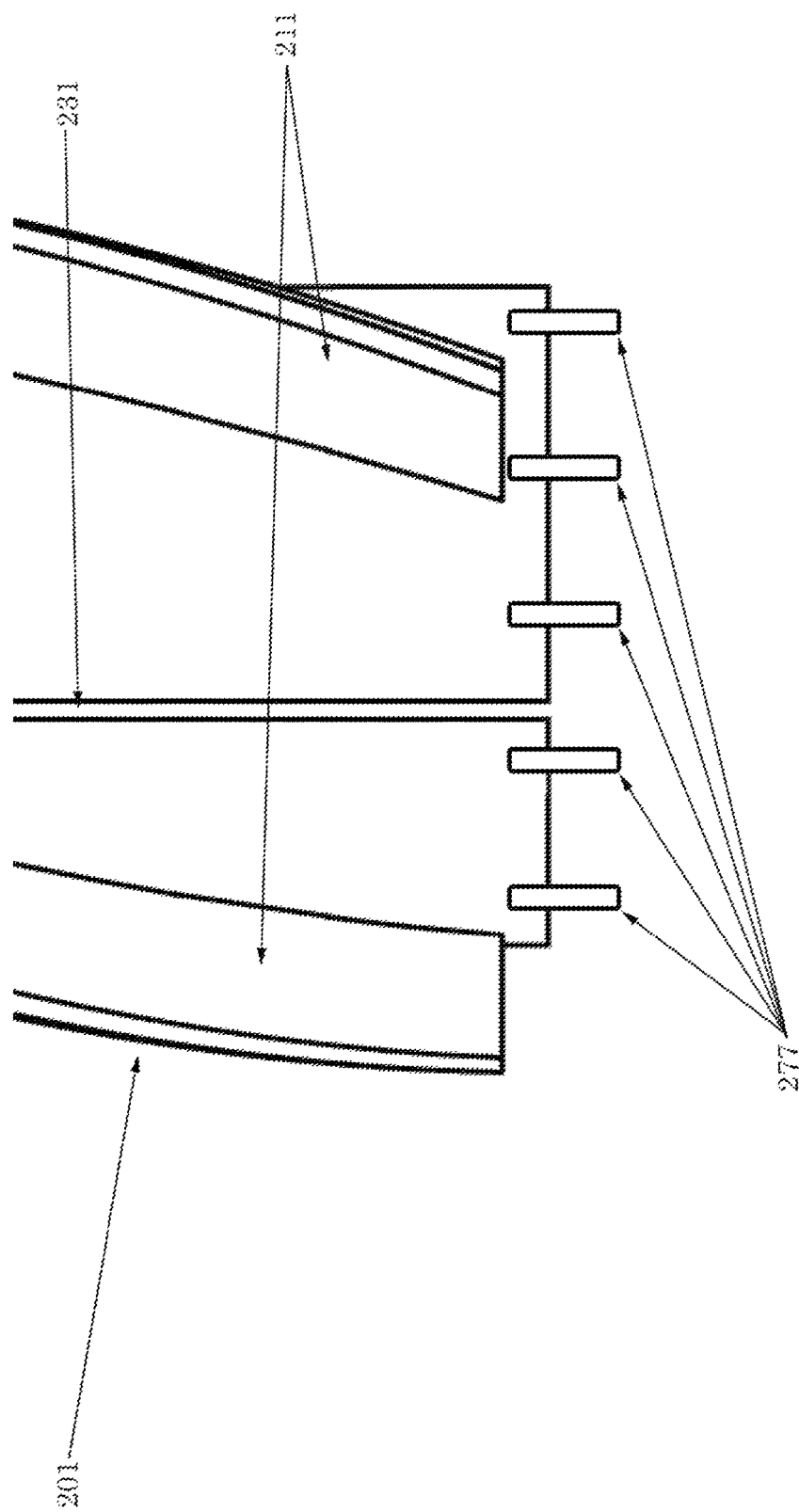
FIG. 17 illustrates a magnified view of tabs in a helical strake body for interfacing with an adjacent helical strake body.

Referring now to FIG. 17, FIG. 17 illustrates a magnified end view of helical strake 201 having fins 211 and gap 231, as previously discussed in reference to FIG. 11. In this embodiment, strake 201 further includes vertically or axially extending tabs 277, which protrude downwardly from the end of strake 201. Tabs 277 may be used to interface with an adjacent helical strake (e.g., strake 202) or collar (e.g., collar 106) similar to the bolts described in FIG. 14, FIG. 15, and FIG. 16. Tabs 277 may be molded into helical strake 201 or fins 211 or tabs 277 may be separate structures that are attached to helical strake 201 or fins 211 by any suitable means. Tabs 277 and structures on an adjacent helical strake or collar (or both) may be coupled by any suitable means including, but not limited to, fastening, welding, clamping, tying (with rope or cable ties or other suitable structures), and riveting. Tabs 277 may be made of any suitable material.

Figure 18:
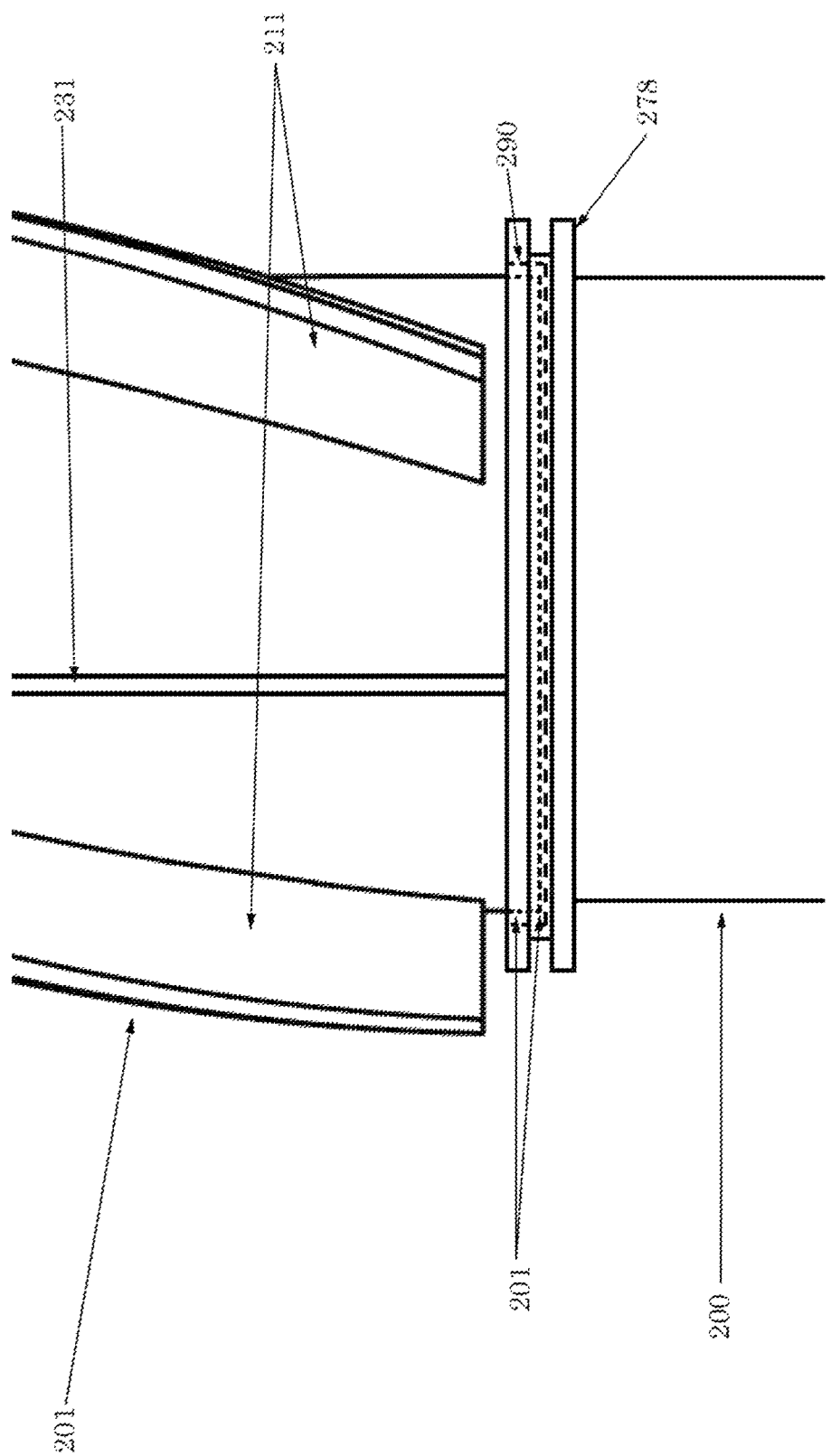
FIG. 18 illustrates a magnified view of a collar overlapping a helical strake body.

Referring now to FIG. 18, FIG. 18 illustrates a magnified side view of an end of helical strake 201 having fins 211 and gap 231 on tubular 200, and including a collar 278 that overlaps the end of helical strake 201. In this aspect, collar 278 holds helical strake 201 in place when collar 278 is tightened against tubular 200 by any suitable means (e.g., fastener, band or the like). Collar 278 may restrict the ability of helical strake 201 to slide down tubular 200 by having an interior recessed region 290 with a slightly larger inside diameter than strake 201, to accommodate the end of helical strake 201 inside of collar 278. Helical strake 201 may, however, be able to rotate within collar 278. Collar 278 may restrict the movement of more than one helical strake, for example, in FIG. 18 there may be a helical strake under the bottom of collar 278 that is also held tight in place or restricted from axial movement. In this aspect, collar 278 may also include an interior recessed region along the bottom side (not shown).

Collar 278 may be of any suitable geometrical size, shape, number of circumferential segments, quantity, and method of tightening against tubular 200. Examples of tightening methods include, but are not limited to, banding, welding, bolting, and chemical bonding. While collar 278 is shown with flanges, these are optional and not required. Collar 278 may be made of any suitable material. All of the functions of collar 278 may also be performed by an adjacent helical strake. The adjacent helical strake may have any or all of the properties described herein for other helical strakes but, in this case, will overlap an adjacent helical strake to hold it in place. Typically the adjacent helical strake will, at a minimum, restrain helical strake 201 from motion along the longitudinal axis of underlying tubular 200 but may also restrict helical strake 201 from other degrees of freedom by holding helical strake 201 tight against underlying tubular 200.

Figure 19:
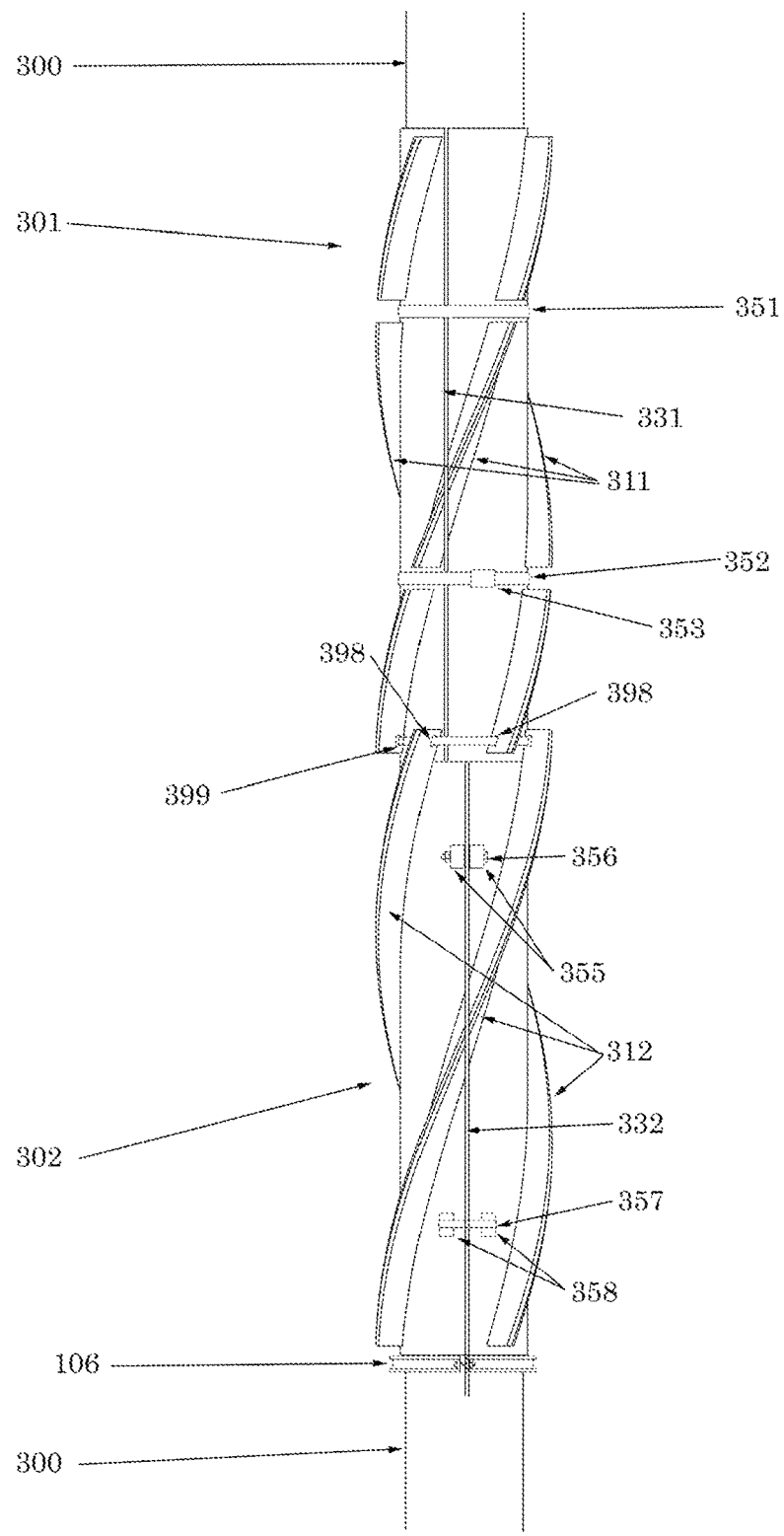
FIG. 19 illustrates a side view of two helical strakes above a collar with overlapping fins.

Referring now to FIG. 19, FIG. 19 illustrates a side view of another embodiment including helical strakes 301 and 302 on tubular 300, and adjacent to collar 106, which is tight against tubular 300. Helical strake 301 has gap 331 and fins 311 while helical strake 302 has gap 332 and fins 312. Helical strake 301 is closed around tubular 300 (across gap 332) using band 351 and band 352 that is shown with buckle 353. Helical strake 302 is closed around tubular 300 using fastener 356 and blocks 355 and also using cable tie 357 and blocks 358. Helical strakes 301 and 302 are separated by an axial gap as previously discussed, but fins 312 may extend past the end of the body of helical strake 302 and be connected with fins 311, and therefore helical strake 301, using coupling band 399.

FIG. 19 is therefore similar to FIG. 11 except that fins 312 extend past the strake body of helical strake 302 and over the strake body of helical strake 301 so that fins 312 overlap somewhat with fins 311. This allows coupling band 399 to pass through openings or slots 398, near the ends of both fins 311 and fins 312. While FIG. 19 shows fins 312 adjacent to fins 311 and separated by a short distance, fins 312 may also be adjacent to, and in contact with, fins 311 or may even go inside or over fins 311 (such that there is a male-female configuration). Fins 312 may also abut fins 311. Any number of coupling bands 399 may be used and, instead of going around the entire circumference of helical strake 301 or helical strake 302, coupling band 399 may go around just part of the circumference of helical strake 301 or helical strake 302 and may also then be doubled back to close coupling band 399. Similarly, fins 312 and 311 may abut, be adjacent to each other, be in a male-female configuration, or be near each other and be attached by other means including, but not limited to, bands, cable ties, bolts, screws, rivets, welding, chemical bonding, or clamping. Fins 312 and 311 may be connected by more than one method and any number of fins 311 and 312 may be present. Some fins 312 on helical strake 302 may extend further than other fins and some may have end geometries or configurations that are different than other fins 312 on helical strake 302 (and similarly for fins 311 on helical strake 301). Different methods of attachment may be used for various pairs or groups of fins. Coupling band 399 may be of any suitable size, shape, quantity, or material.

Figure 20:
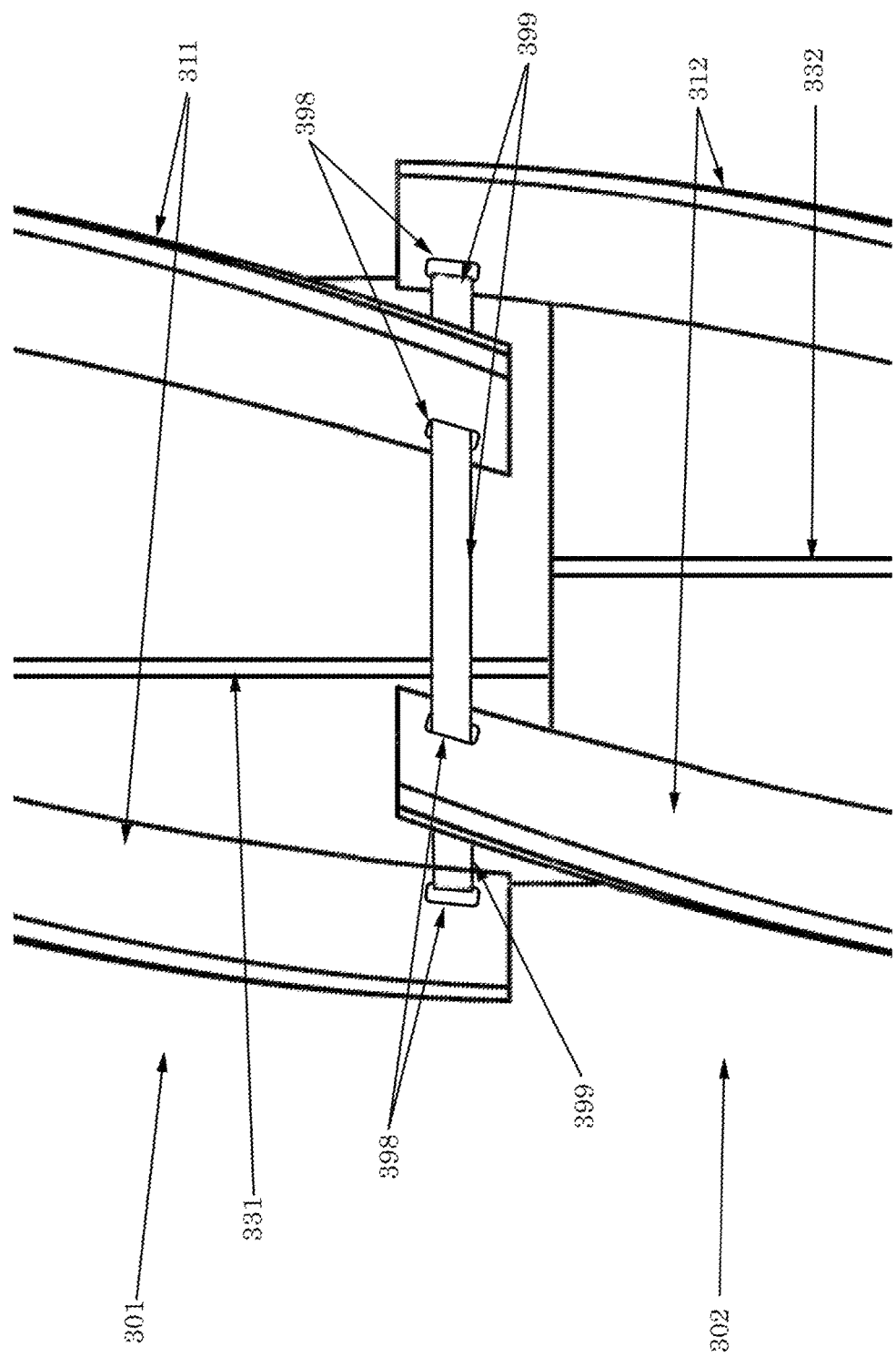
FIG. 20 illustrates a magnified view of the overlapping fins between two helical strakes of FIG. 19.

Referring now to FIG. 20, FIG. 20 illustrates a magnified side view of helical strakes 301, 302 of FIG. 19. From this view, the coupling between strakes 301 and 302, as previously discussed, can be seen. In particular, coupling band 399 is shown passing through slots 398 in fins 311 on helical strake 301 and in fins 312 on helical strake 302. Gap 331 is present in helical strake 301 and gap 332 is present in helical strake 302. Slots 398 may be elongated openings or channels that extend through the entire width dimension of fins 311, 312. In this aspect, slots 398 allow coupling band 399 to pass through the fins however coupling band 399 may also pass over the top of fins 311 and 312 or may pass through, inside, over, or under, other appurtenances that may, or may not, be present for that purpose. Coupling band 399 may be a single band or band segment or may include multiple segments that are attached to each other by any suitable means. Segments of coupling band 399 may also be connected to fins 311 or fins 312 or to other appurtenances. Slots 398 may be of any suitable size, shape, or quantity and may be molded in or created after molding. Other band-type structures such as cable ties may be used to connect adjacent fins (from either helical strake) or these band-type structures may traverse the full circumference of helical strake 301 or 302. Other fastening methods may also be used to attach various fins including, but not limited to, cabling, screws, bolts, rivets, welding, chemical bonding, clamping, rope, or any combination thereof.

Figure 21:
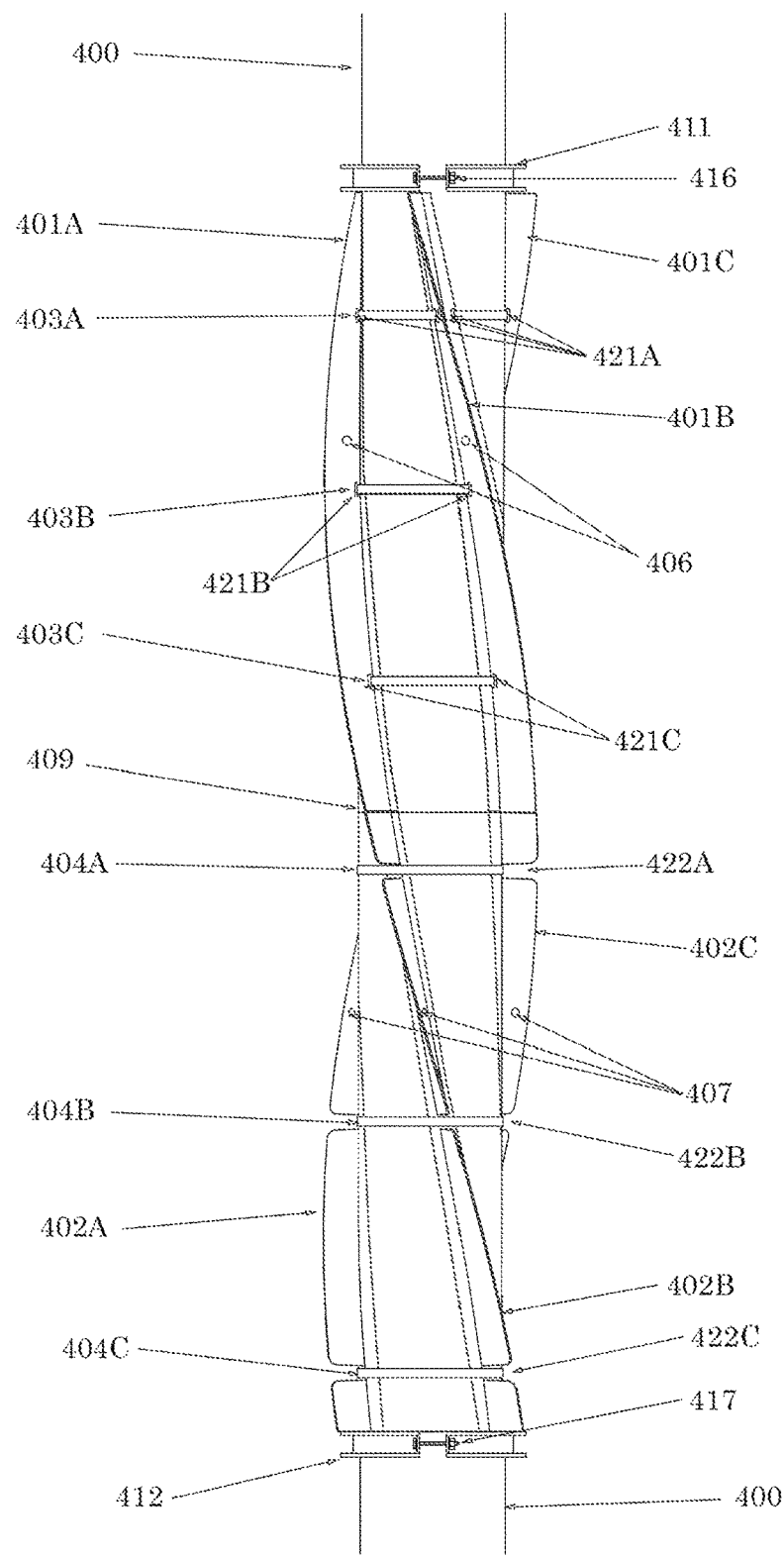
FIG. 21 illustrates one embodiment of a side view of two groups of banded fins on a tubular that are restrained along the tubular axis by collars.

FIG. 21 illustrates a side view of another embodiment of a helical strake assembly. In this embodiment, a first set of fins 401A, 401B, and 401C are attached directly to the outer surface of an upper part of tubular 400 (without an underlying shell) using bands 403A, 403B, and 403C. In addition, a second set of fins 402A, 402B, and 402C are banded directly to an outer surface of the lower part of tubular 400 using bands 404A, 404B, and 404C. Collar 411 is shown clamped tight around tubular 400 using fastener set 416 and collar 412 is shown clamped tight around tubular 400 using fastener set 417.

Each of fins 401A, 401B and 401C include banding slots 421A, through which band 403A is inserted, banding slots 421B for insertion of band 403B, and banding slots 421C for insertion of band 403C. Banding slots 421A-421C may be openings formed through the entire width dimension of each of fins 401A, 401B and 401C.

In addition, banding channels 422A, 422B and 422C for accommodating bands 404A, 404B and 404C, respectively, are formed in each of fins 402A, 402B and 402C, as shown. Banding channels 422A, 422B and 422C may be recessed regions formed inwardly from the outer edge of each of fins 402A, 402B and 402C, but do not extend all the way through the fins. In other words, each of fins 402A, 402B and 402C are still one continuous fin that remains connected along a base region.

In addition, handling appurtenances 406 may be provided on the upper set of fins 401A, 401B, and 401C while handling appurtenances 407 are present on the lower set of fins 402A, 402B, and 402C. Gap 409 separates the upper fins 401A, 401B, and 401C from the lower fins 402A, 402B, and 402C.

Again referring to FIG. 21, since collars 411 and 412 are clamped tight around tubular 400, fins 401A, 401B, 401C, 402A, 402B, and 402C are restrained axially by the collars and by adjacent fins. The consequence is that bands 403A, 403B, 403C, 404A, 404B, and 404C do not need to be very tight so that they may be hand tightened during installation which is much faster than using a tool. In addition, any number of fins or sets of fins may be supported or restrained by a single collar so that the time required to install and tighten the collars may be substantially less than the time required to tighten all of the bands using a tool.

Still referring to FIG. 21, the bands may be put on through banding slots such as 421A, 421B, and 421C or may be installed through banding channels such as 422A, 422B, and 422C. Since the bands only require minimal tension to keep the fins adjacent to the pipe and do not require tension to keep the fins from sliding, cable ties, rope, cable, or other devices may be used in place of bands 403A, 403B, 403C, 404A, 404B, and 404C. Any number of bands may be used on any fin or set of fins and the fins may be of any suitable length. Each fin may be of the same length of different fins within the same set, or on adjacent sets, may all be of the same length of may be made of different lengths. Fin cross sections may be mixed or matched. Band slots and band channels may be mixed or matched even on a single fin. Adjacent fins, such as fins 401A and 402B, may be connected at gap 409 (by any suitable means) or may be unconnected at gap 409. Fins 401A, 401B, 401C, 402A, 402B, and 402C may be continuous or discontinuous and may have fin heights (the distance from the base of the fin against the underlying tubular 400 to the tip of the fin or the point farthest from the underlying tubular) that are constant along the fin length or that vary along the fin length. While FIG. 21 shows three fins in each set of fins, any number of fins may be used to make up a fin set and any number of fins may reside at any longitudinal location along tubular 400. Collars 411 and 412 may be made of two or more segments around the circumference of tubular 400, for example collars 411 and 412 may be made in two halves as shown in FIG. 21. Various segments of collars 411 and 412 may be connected or clamped against tubular 400 by any suitable means including fastening, banding, and clamping. Collars 411 and 412 may also be attached to tubular 400 for example by fastening or bonding the collars directly into the outside of tubular 400. Collars 411 and 412 may completely encircle tubular 400 or may cover only a portion of the circumference of tubular 400. Collars 411 and 412 may be of any suitable height along the longitudinal axis of tubular 400. Any number of fin sets may be used between adjacent collars. Handling appurtenances 406 and 407 are entirely optional and may include holes or slots, knobs, handles, or any suitable device and any suitable combination thereof. Fins 401A, 401B, 401C, 402A, 402B, and 402C may also be attached directly, or indirectly, to collars 411 or 412 by extending the fins through a slot in the collar or by any other suitable means including fasteners and chemical bonding.

Still referring to FIG. 21, fins 401A, 401B, 401C, 402A, 402B, and 402C may be made of any suitable material including, but not limited to, plastic, rubber or other elastomer, metal, fiberglass, or composite or any combination thereof. Similarly, bands 403A, 403B, 403C, 404A, 404B, and 404C, handling appurtenances 406 and 407, collars 411 and 412, and fastener sets 416 and 417, may be made of any suitable material including, but not limited to, plastic, rubber or other elastomer, metal, fiberglass, synthetic, or composite or any combination thereof.

Figure 22:
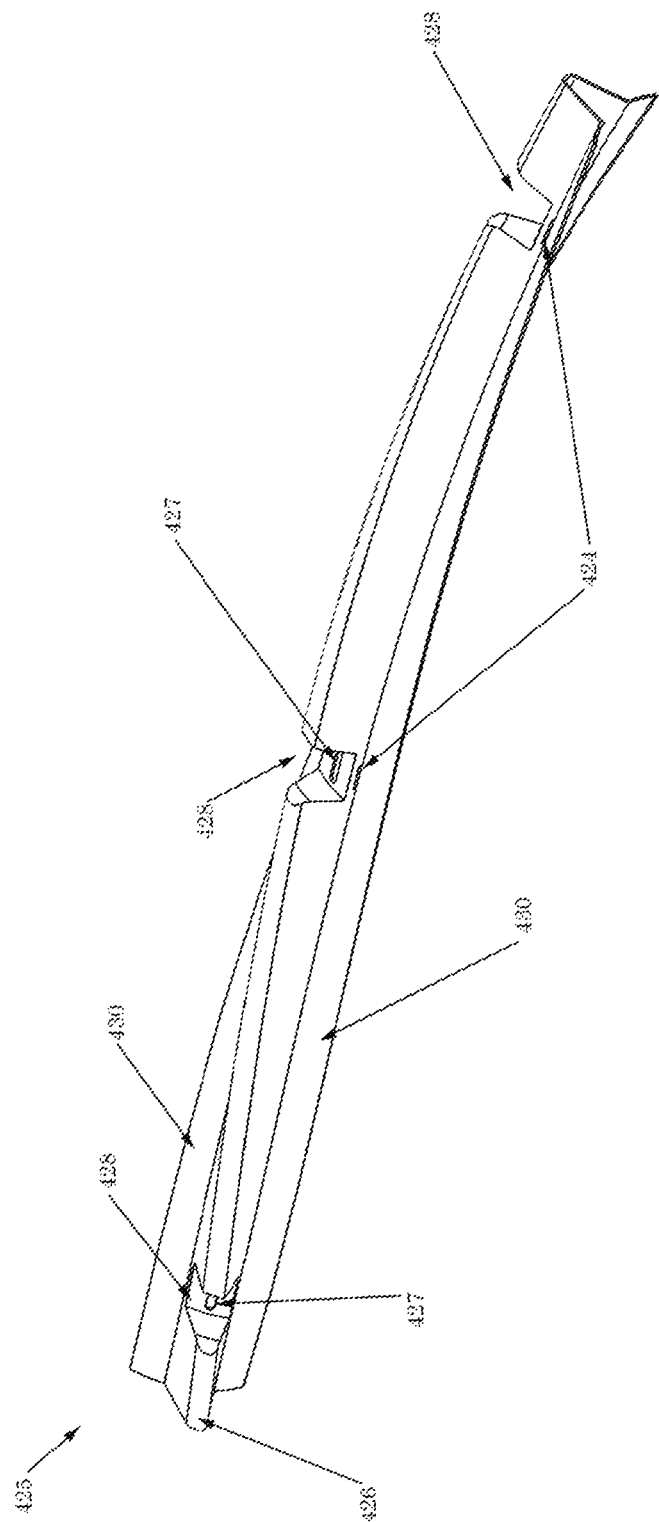
FIG. 22 illustrates one embodiment of a perspective view of a banded fin.

Referring now to FIG. 22, FIG. 22 illustrates a perspective view of a fin. Representatively, fin 425 may be any one or more of the fins in the sets of fins 401A-401C and 402A-402C, previously discussed in reference to FIG. 21. Fin 425 may include vertical fin 426 and base 430. In addition, fin 425 may include banding slots 424 and banding channels 428. Banding slots 424 and banding channels 428 may both be present at three locations and each location may also include a spring slot 427. Banding slots 424 may be openings that are formed entirely through vertical fin 426 in a widthwise direction (and are entirely closed along the lengthwise direction). Banding channels 428 may be recessed regions, which are formed inwardly from the edge of vertical fin 426 as will be discussed in more detail in reference to FIG. 23.

Again referring to FIG. 22, fin base 430 is optional but may be used to compress fin 425 (when band slot 424 is used for the band) against an underlying tubular if the fin is hollow and does not have a base in vertical fin 426 such as is the case with fin 425. While fin 425 has both banding slots and banding channels, both may be present when a strake system utilizes springs on part of the fins and not on all of the fins so that part of the fins will utilize the band slot 424 for banding and part of the fins will have the band go over a spring that extends through spring slot 427 and not go through banding slot 424.

Still referring to FIG. 22, fin base 430 may be of any suitable width or thickness and may, or may not, extend along the entire length of fin 425. For example, fin base 430 may reside only where it is contacted by the bands and not reside along the rest of the length of fin 425. Vertical fin 426 may be of any suitable cross section and thickness and may have any number of banding slots 424 or banding channels 428. Each band location may have a banding slot 424, a banding channel 428, or both. It is also possible to band fin 425 against an underlying tubular without a banding slot 424 or a banding channel 428 present. Spring slot 427 may be of any suitable size or shape and may house any number of springs. The spring within spring slot 427 may be made of a rubber or elastomeric element but may house other materials that are used as springs. The main purpose of a spring is to keep the overlying band tight when the underlying tubular experiences changes in its diameter, for example shrinkage of the diameter due to hydrostatic pressure.

Still referring to FIG. 22, fin 425 including fin base 430 and vertical fin 426, may be made of any suitable material including, but not limited to, plastic, rubber or other elastomer, metal, fiberglass, synthetic, or composite or any combination thereof.

Figure 23:
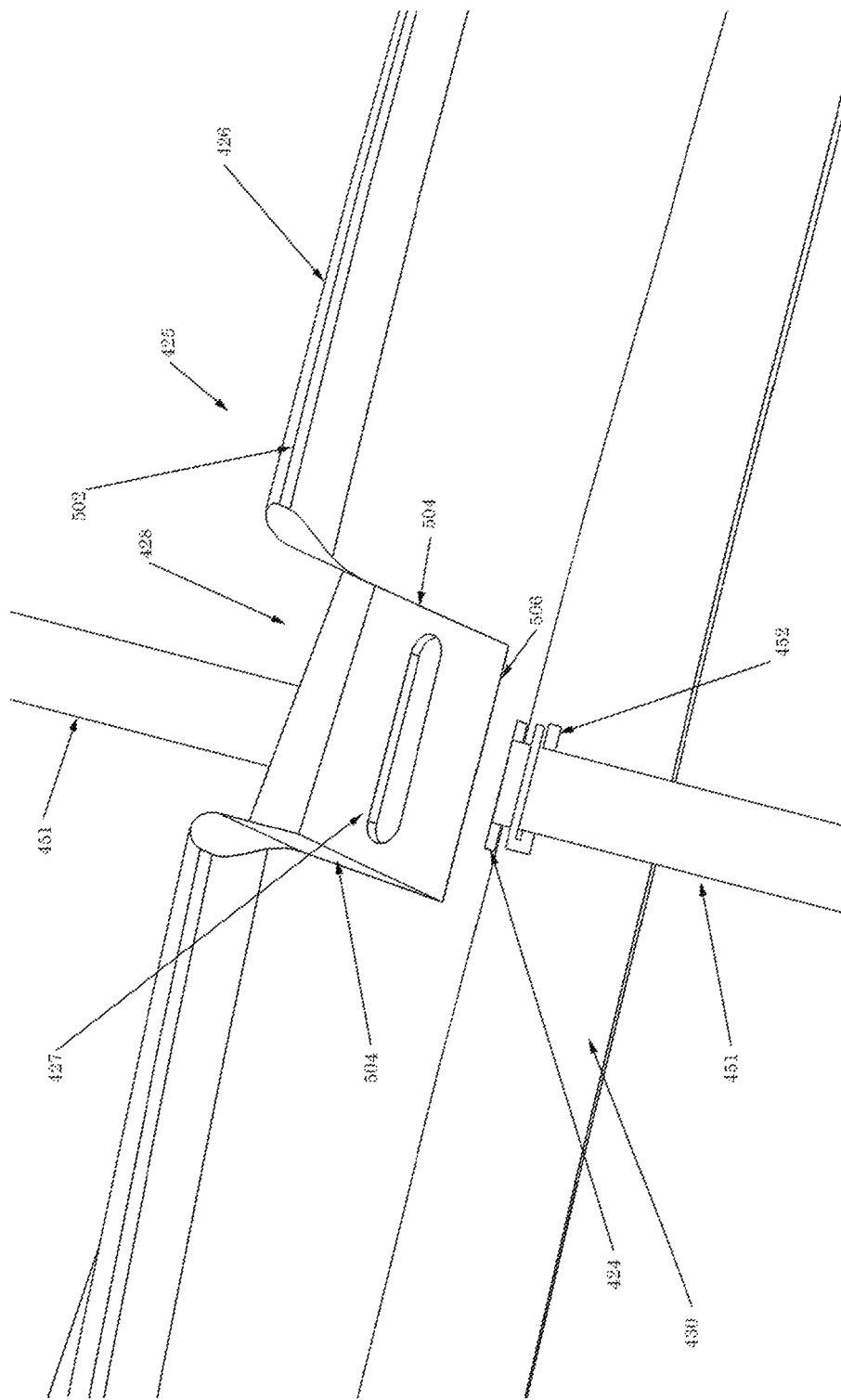
FIG. 23 illustrates a magnified view of a band and a banded fin with a restraining device on the band of FIG. 22.

Referring now to FIG. 23, FIG. 23 illustrates a magnified view of the fin of FIG. 22. From this view, it can be seen that fin 425 includes vertical fin 426, fin base 430, banding slot 424, banding channel 428 and spring slot 427, as previously discussed. From this view, it can be seen that banding channel 428 is a recessed region formed inwardly from the outer edge 502 of vertical fin 426, to form a channel that is defined by sidewalls 504 extending vertically from opposing sides of a bottom wall 506. It can further be seen that banding channel 428 extends in a widthwise direction across vertical fin 426, and is open at the top and ends so that the band can rest therein. Spring slot 427 is an elongated opening or recess formed within bottom wall 506. For example, spring slot 427 may be an elongated opening or recess having a length dimension parallel to the length dimension of fin 425. In this aspect, when a spring is inserted into, or otherwise associated with spring slot 427, a band inserted within banding channel 428 is positioned over the spring, and the spring in turn accommodates for any changes in tubular diameter. For example, if the tubular diameter shrinks, the spring will expand thus maintaining a constant force between the band, the fin and the tubular. In addition, banding slot 424 is shown formed through the portion of vertical fin 426 adjacent fin base 430. Banding slot 424 may extend entirely through vertical fin 426 in a widthwise direction. In some embodiments, banding slot 424 is formed between the bottom wall 506 of banding channel 428 and fin base 430. It is contemplated, however, that in some embodiments, banding slot 424 is formed through fin base 430. In addition, although banding slot 424 is shown aligned with banding channel 428 (e.g., channel 428 is on top of slot 424), in other embodiments, banding slot 424 and banding channel 428 are at any position along fin 425.

Band 451 is shown positioned through banding slot 424. In some embodiments, band 451 may be partially restrained by band clip 452. Band clip 452 may be installed tightly against band 451 so that band 451 is at a fixed position within banding slot 424. A band clip 452 on the far side of fin 425 (i.e. not shown) may also be used to prevent band 451 from traveling in either direction. The purpose of band clip(s) 452 is to restrain band 451 relative to fin 425 during installation so that fin 425 and adjacent fins may be easily held in place prior to tightening of band 451 (by hand or using a banding tool).

Still referring to FIG. 23, band clip 452 represents any suitable clip, clamp, or device that can be clamped, or otherwise secured, to band 451 to prevent it from sliding through slot 424. Band clip 452 may include, but is not limited to, cable ties, alligator clips and various other suitable clips, welded appurtenances, clevis or cotter pins or other types of pins, rings, epoxy or other painted on materials to provide interference, tape, and wire or rope. Band clip 452 may include more than one device or structure and may be made of any suitable material. Any number of band clips 452 may be used on a single band.

Figure 24:
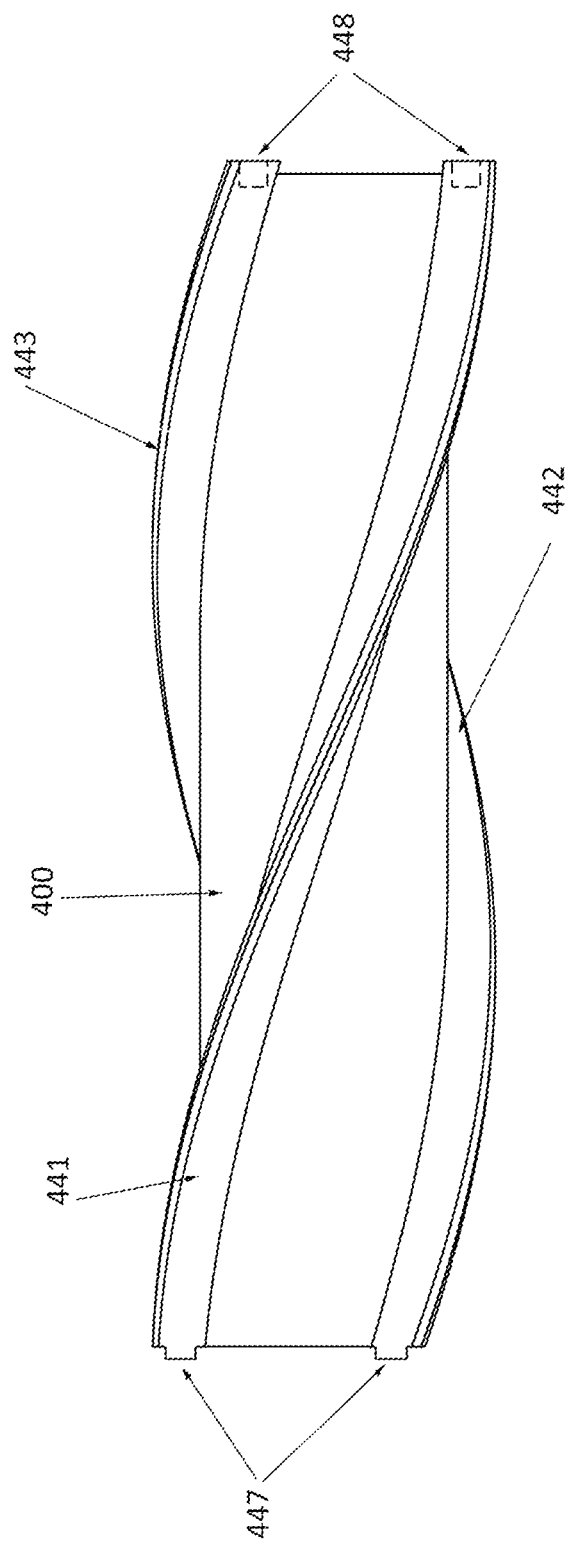
FIG. 24 illustrates one embodiment of a side view of a tubular with male and female ends.

Referring now to FIG. 24, FIG. 24 illustrates another embodiment of a helical strake. In this embodiment, fins 441, 442, and 443 are shown attached to tubular 400. Each fin has a male end 447 (e.g., protruding region) and a female end 448 (e.g., recessed region). Each male end 447 may be designed to be fitted into the female end 448 of an adjacent fin so that the two mated fins form a continuous, or nearly continuous fin. Banding slots or banding channels may also be present in the male or female ends (or both) as previously discussed in reference to FIG. 23 so that a band may be used for both adjacent fins. Each fin may, or may not, have a male or female end. Thus, it is possible for some fins to have male or female ends (or both) and others not to have male or female ends. Adjacent fins may also be connected by various devices or methods and additional connecting pieces may be used to attach, connect, or align adjacent fins. It is important to note that FIG. 24 does not show any bands because fins 441, 442, and 443 may be attached to tubular 400 by means other than banding including, but not limited to, chemical bonding, fastening, and clamping. Other hardware may be used to attach fins 441, 442, and 443 to, or clamp fins 441, 442, and 443 against, tubular 400 including clamps and collars. Male end 447 and female end 448 may include additional pieces or hardware and may be made of any suitable material.

Figure 25:
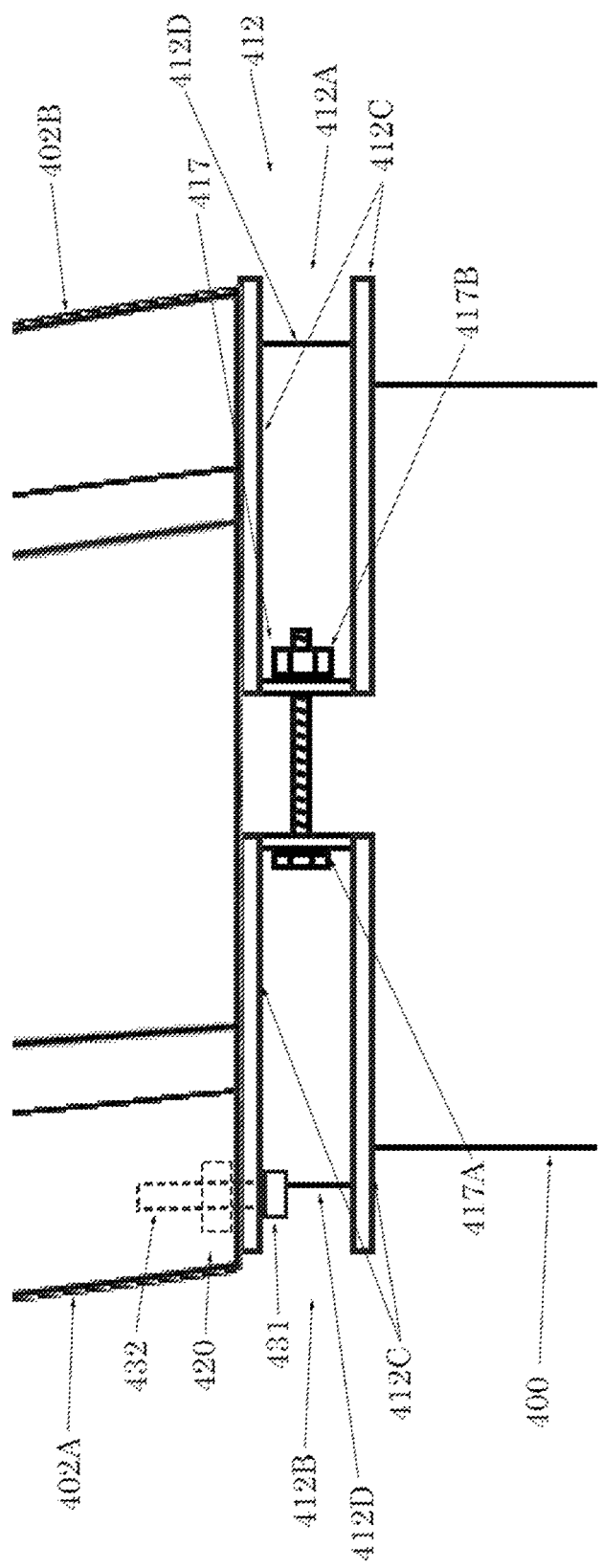
FIG. 25 illustrates one embodiment of a side view of a collar and the bottom of a group of banded fins that are restrained from rotation relative to the underlying tubular and collar.

Referring now to FIG. 25, FIG. 25 illustrates a magnified view of a strake end. From this view, it can be seen that fins 402A and 402B are adjacent to tubular 400 and one or more fins 402A and 402B are attached to collar 412 using fin fastener 420, which includes fin bolt 431 and fin nut 432. Fin bolt 431 may be inserted through a flange of collar 412, and into the end of fins 402A and/or 402B. Collar 412 may include collar halves 412A and 412B and each collar half may include collar flanges 412C and collar web 412D. Collar halves 412A and 412B are clamped tight against tubular 400 and to each other using collar fastener 417. Collar 417 may include a collar bolt 417A and collar nut 417B.

Again referring to FIG. 25, fins 402A and 402B cannot slide past collar 412 even if fin fastener 420 is not present. However, depending upon how tight the banding or bonding of fins 402A and 402B are to tubular 400, it is possible for fins 402A and 402B to rotate around tubular 400. However, with fin fastener 420 present, fin 402A is restricted from rotating around tubular 400 since collar 412 is tight against tubular 400 and fin 402A is attached to collar 412. In this manner, the collars may be used to restrict rotation of adjacent fins. If the adjacent fins are, in turn, attached to other adjacent fins, then a large length of fins may be restricted from rotating using a single collar.

Still referring to FIG. 25, any number of fin fasteners 420 may be used and any suitable method or fastener may be used for fin fastener 420. For example, it may be possible to restrict fin rotation by simply inserting one end of the fin into a slot in collar 412.

Still referring to FIG. 25, each half of collar 412 may include a web 412D that is a thin member adjacent to tubular 400 and two flanges 412C that extend away from tubular 400 (e.g., in a direction normal to the tubular) so that the ends of fins 402A and fins 402B rest against flanges 412C. However, other collar geometries may be used instead, for example the collar may be rectangular or square in cross section or may be round in cross section. Collar 412 represents any suitable collar which may be comprised of any number of suitable components and may be made of any suitable material. Also, as noted above, various components of collar 412 may be attached or connected using any suitable mechanism and thus this attachment is not limited to using collar fastener 417. Collar components may also be banded or chemically bonded to tubular 400 or attached to tubular 400 by any suitable means or methods.

The above aspects of this invention may be mixed and matched in any manner suitable to achieve the purposes of this invention.

In broad embodiments, the present invention is directed to banded fins that utilize a collar to assist with keeping them axially or circumferentially restrained. In other embodiments, the present invention is directed to a helical strake system using a collar to maintain the axial location of adjacent helical strakes. In still further embodiments, the present invention is directed to a helical strake system using a collar to maintain the axial location of adjacent helical strakes with an optional nut inside of, or welded to, a flange on the helical strake.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For several of the ideas presented herein, one or more of the parts may be optional. The invention should therefore not be limited by the above described embodiment, method, and examples, but by all embodiments and methods within the scope and spirit of the invention.

What is claimed is:

1. A vortex-induced vibration (VIV) suppression system comprising:
    a helical fin dimensioned to encircle an underlying tubular, the helical fin having a top end, a bottom end, and an outer edge extending between the top and the bottom end, and wherein the outer edge is radially outward from an underlying tubular when the helical fin is positioned around the underlying tubular, and the top end or the bottom end comprises an engaging member that protrudes above or below the top end or the bottom end when the helical fin is positioned around the underlying tubular; and
    a collar dimensioned to encircle an underlying tubular and axially align the helical fin along the underlying tubular, wherein the collar comprises a collar web and at least one flange extending radially outward from the collar web, and the engaging member extends through the at least one flange to couple the helical fin to the collar.

2. The VIV suppression system of claim 1 wherein the collar is positioned adjacent the top end or the bottom end of the helical fin, and the top end or the bottom end of the helical fin rests on the collar.

3. The VIV suppression system of claim 1 wherein the helical fin is coupled to a body portion dimensioned to at least partially encircle the underlying tubular, and the collar comprises a height dimension that is less than that of the helical fin.

4. The VIV suppression device of claim 1 wherein the collar comprises a first flange and a second flange that are connected together by the collar web.

5. The VIV suppression device of claim 1 wherein the helical fin maintains a helical shape in the absence of the collar.

6. A vortex-induced vibration (VIV) suppression system comprising:
    a plurality of helical fins dimensioned to encircle an underlying tubular, each of the plurality of helical fins having a top end, a bottom end, and an outer edge extending between the top and the bottom end, and wherein the outer edge is radially outward from an underlying tubular when the helical fin is positioned around the underlying tubular, and the top end or the bottom end of each of the plurality of helical fins comprises an engaging member that protrudes above or below the top end or the bottom end when the helical fin is positioned around the underlying tubular; and
    a collar dimensioned to encircle an underlying tubular and axially align the helical fin along the underlying tubular, wherein the engaging member is attached to the collar.

* * * * *